(12) United States Patent
Lau et al.

(10) Patent No.: US 6,542,699 B2
(45) Date of Patent: Apr. 1, 2003

(54) CAMERA

(75) Inventors: Ming Tung Lau, Chaiwan (HK); Quan Jiang, Chaiwan (HK)

(73) Assignee: Ginfax Development Limited, Chai Wan (HK)

( * ) Notice: Subject to any disclaimer, the term of this patent is extended or adjusted under 35 U.S.C. 154(b) by 0 days.

(21) Appl. No.: 09/846,383

(22) Filed: May 2, 2001

(65) Prior Publication Data

US 2001/0028797 A1 Oct. 11, 2001

Related U.S. Application Data

(62) Division of application No. 09/177,369, filed on Oct. 23, 1998, now Pat. No. 6,289,181.

(30) Foreign Application Priority Data

Oct. 24, 1997 (GB) ............................................. 9722586
Sep. 3, 1998 (GB) ............................................. 9819266

(51) Int. Cl.[7] ............................................. G03B 17/24
(52) U.S. Cl. ..................... 396/316; 396/332; 396/544
(58) Field of Search ............................. 396/315, 316, 396/322, 332, 544

(56) References Cited

U.S. PATENT DOCUMENTS

| | | | |
|---|---|---|---|
| 2,257,676 A | | 9/1941 | Gance et al. |
| 3,148,015 A | | 9/1964 | Weaver |
| 3,588,227 A | | 6/1971 | Yamamoto |
| 3,628,430 A | * | 12/1971 | Morse ........................ 355/43 |
| 3,794,409 A | | 2/1974 | Johnson |
| 4,124,859 A | | 11/1978 | Huber |
| 4,506,964 A | | 3/1985 | Hayles |
| 4,707,106 A | * | 11/1987 | Johnson et al. ............. 396/276 |
| 4,708,449 A | | 11/1987 | Thomas |
| 4,741,605 A | | 5/1988 | Alfredsson et al. |
| 4,827,291 A | | 5/1989 | Guez |
| 4,875,066 A | | 10/1989 | Rickard |
| 4,994,831 A | | 2/1991 | Marandi |
| 5,073,789 A | * | 12/1991 | Mumpower .................. 396/337 |
| 5,546,152 A | | 8/1996 | Fortson |
| 5,563,675 A | | 10/1996 | Adolphi et al. |
| 5,835,795 A | | 11/1998 | Craig et al. |
| 5,897,231 A | * | 4/1999 | Gatti .......................... 396/332 |

FOREIGN PATENT DOCUMENTS

| | | |
|---|---|---|
| GB | 0193969 A | 3/1923 |
| GB | 0335696 A | 10/1930 |
| GB | 2177655 A | 1/1987 |

OTHER PUBLICATIONS

Hedgecoe, John, *The Photographer's Handbook*, 1978, p. 128.

* cited by examiner

*Primary Examiner*—David M. Gray
(74) *Attorney, Agent, or Firm*—Birch, Stewart, Kolasch & Birch, LLP

(57) ABSTRACT

A camera is provided with an object lens, an aperture and a guiding device for an image-recording medium. The camera includes a device for providing generally scattered or white light to be incident on a first portion of the image-recording medium and a light adjusting device for varying the dissipation of the white or scatted light across the aperture of the camera in relation to the exposure time across the aperture. The camera also includes a lens system with an object lens and an additional focusing device with a focal length in a first area being infinite and in a second area being a relatively short focusing light on the image close to the lens system, for example, on the plate held in front of the lens system. A light enhancement device is also provided for increasing the light on the first portion of the image-recording medium.

15 Claims, 29 Drawing Sheets

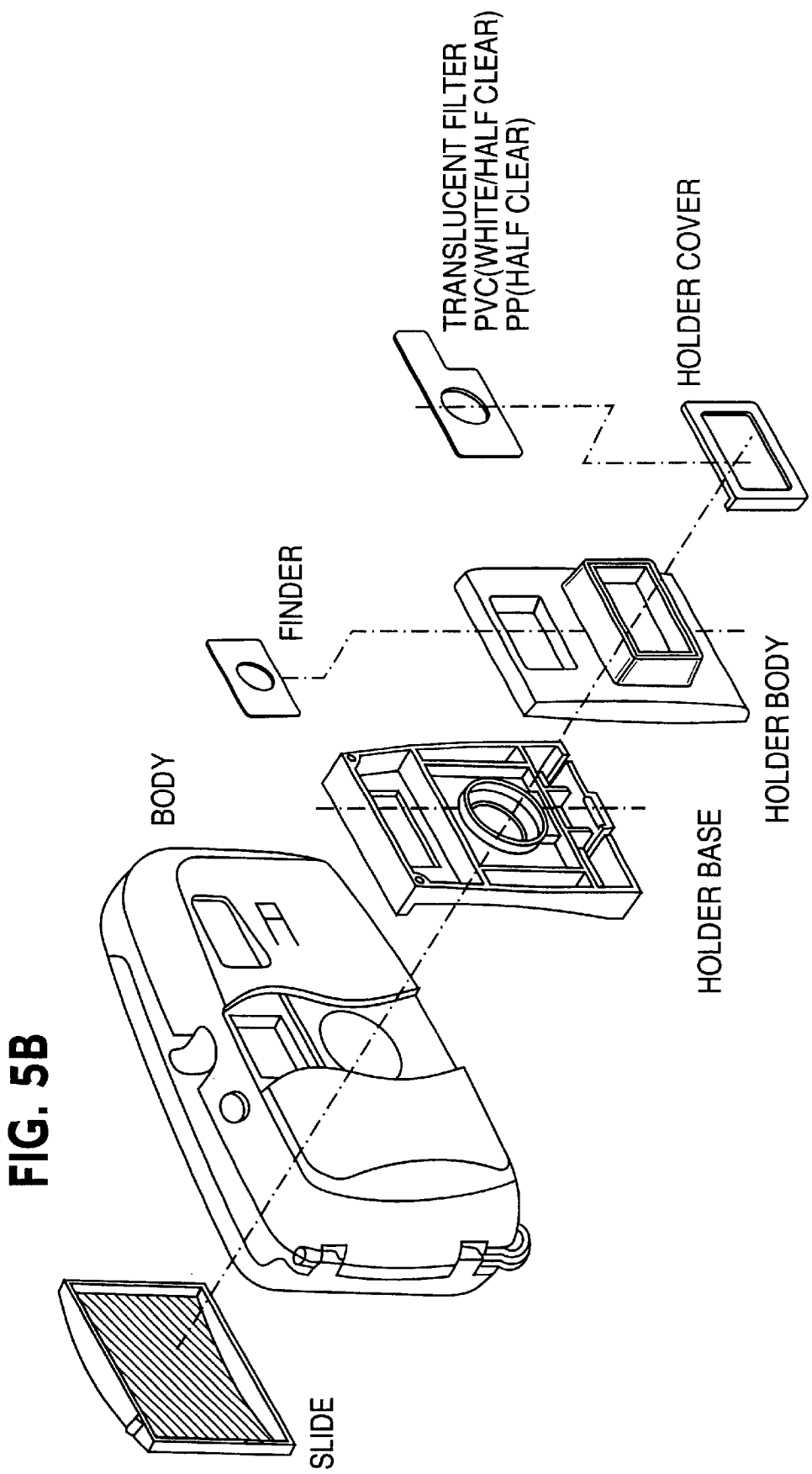

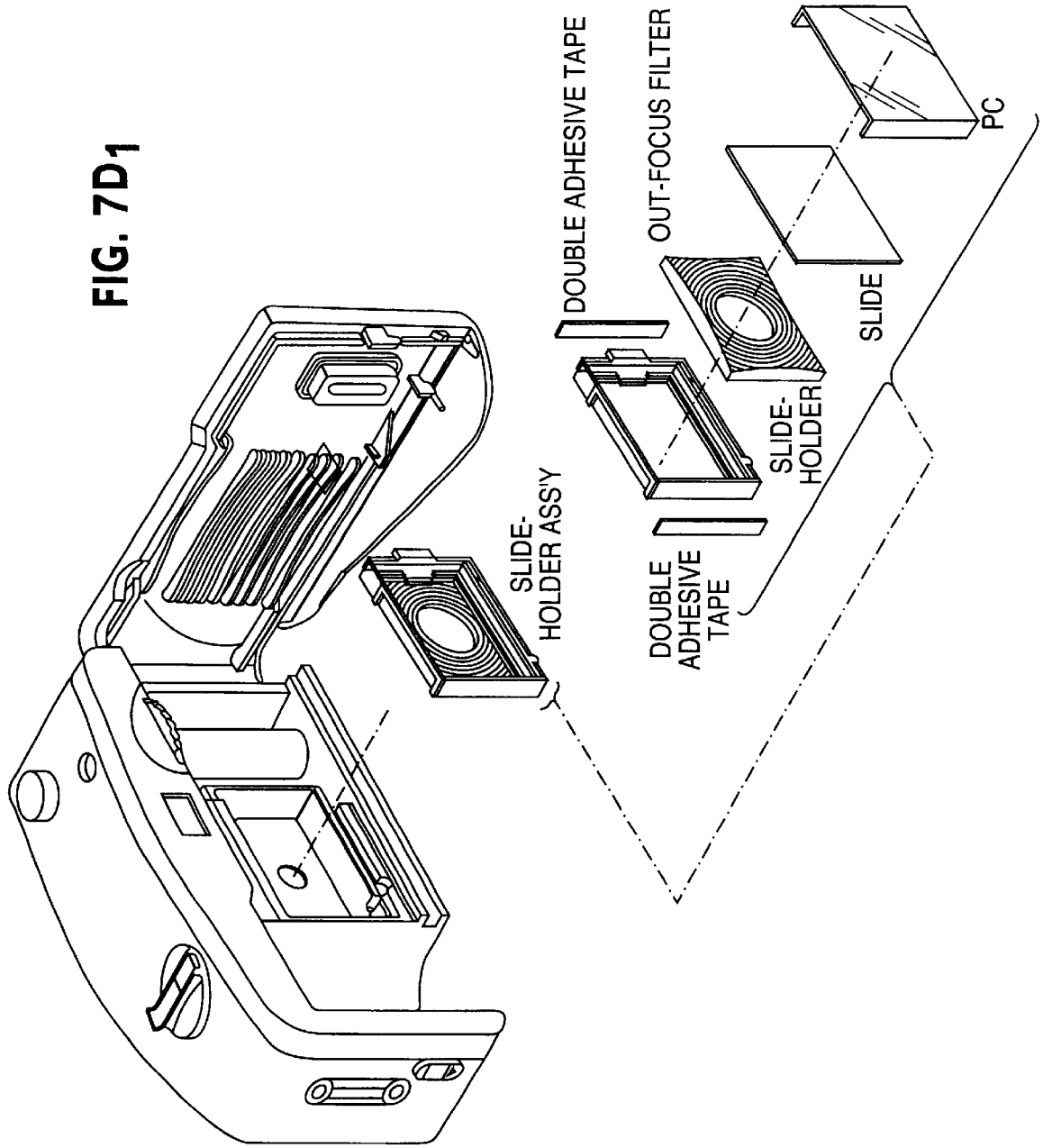
FIG. 7D₁

FIG. 7D₂
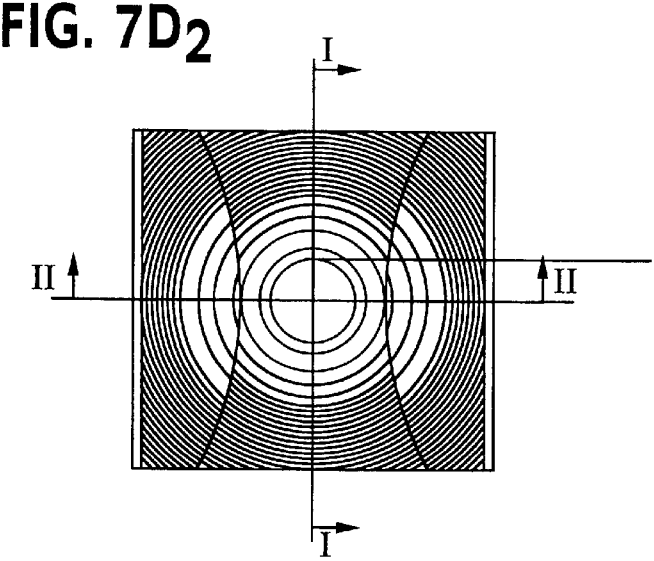
FIG. 7D₃
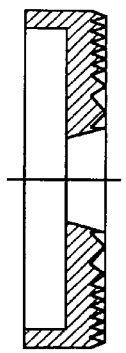
FIG. 7D₄
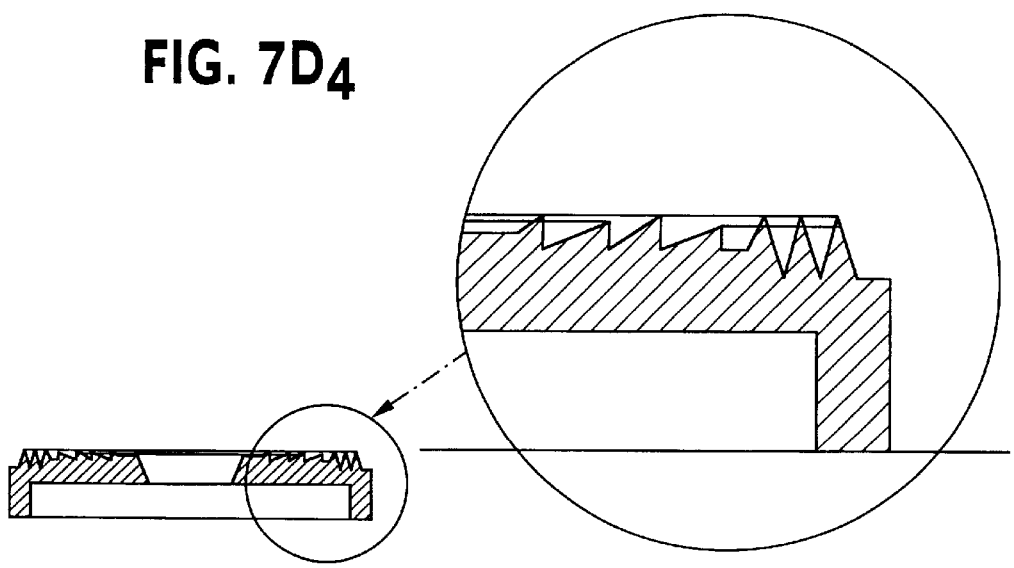

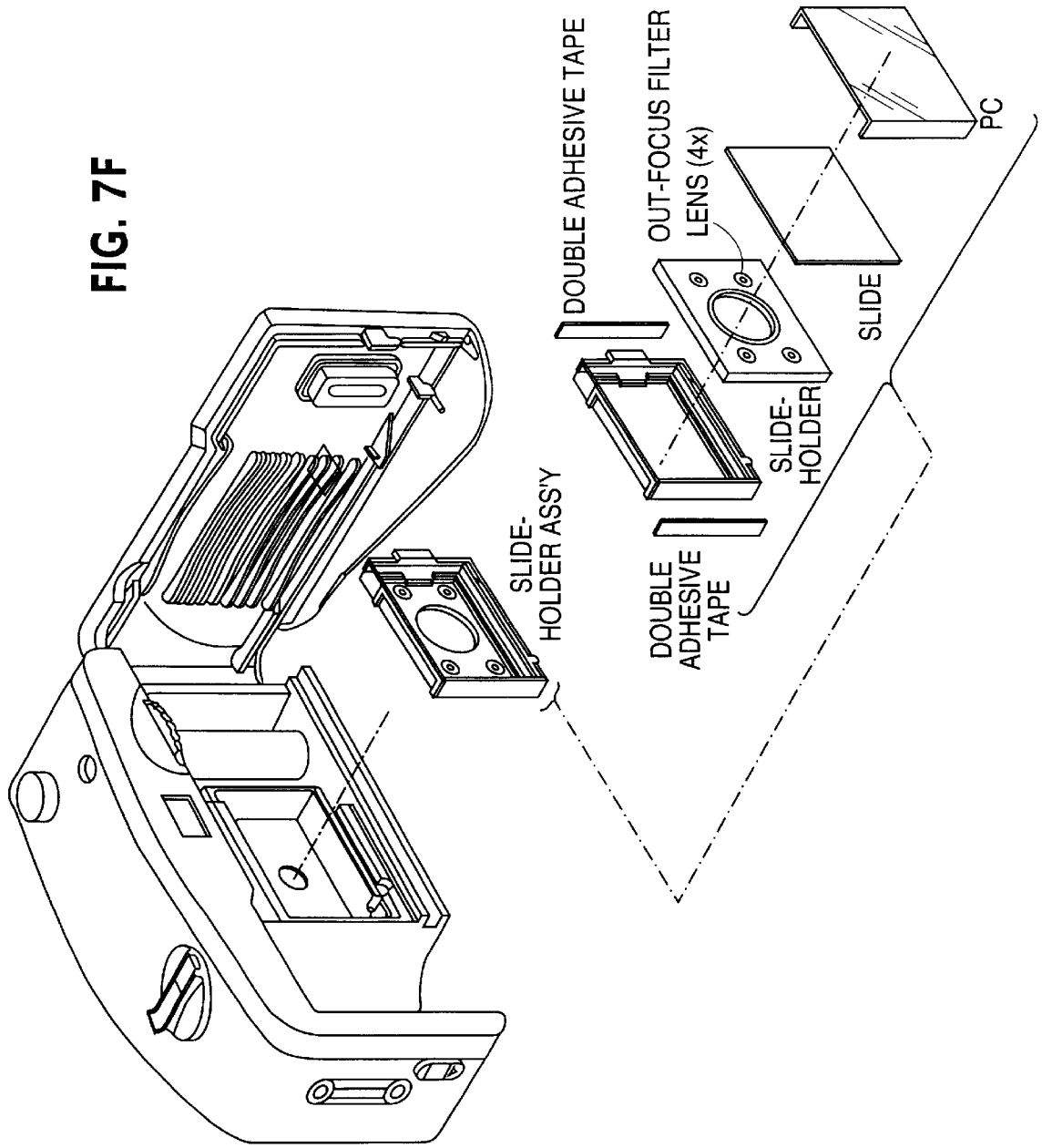

FIG. 7H
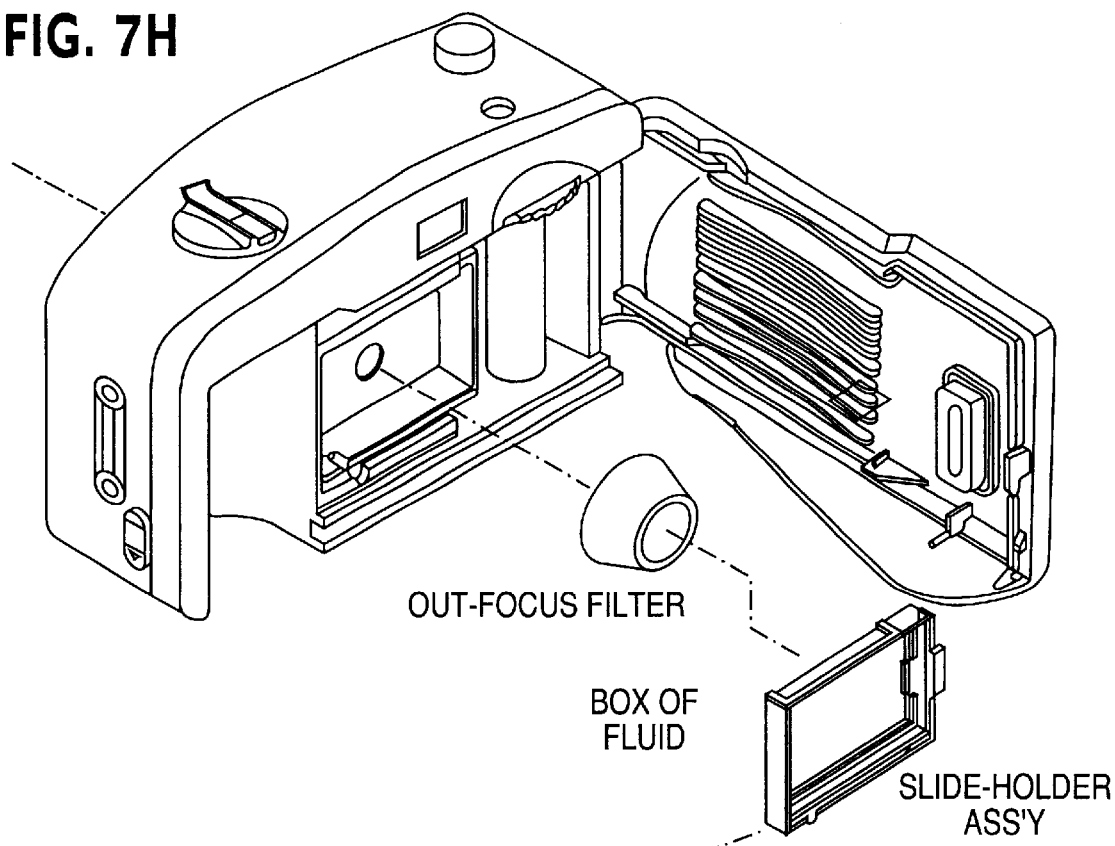
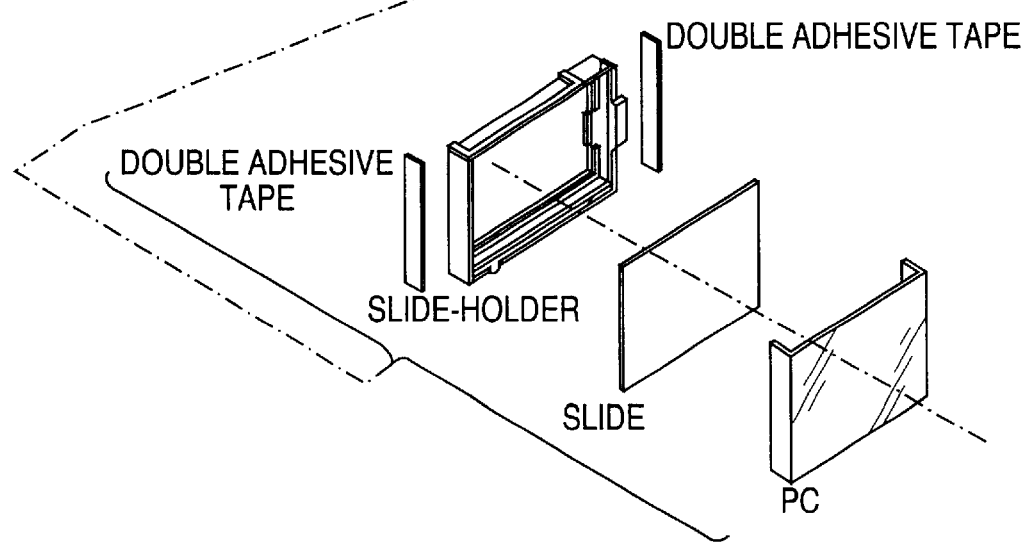

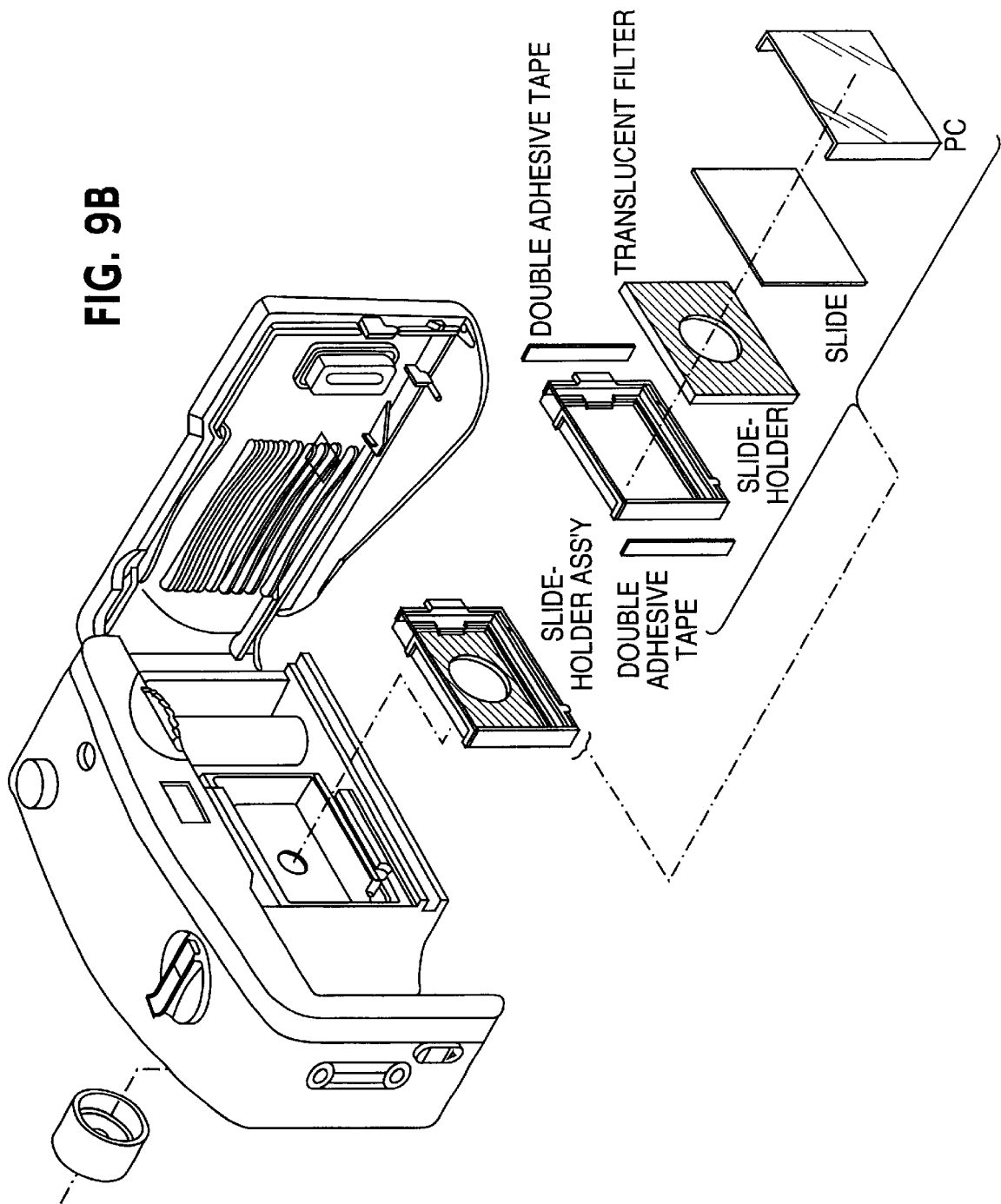

FIG. 11A
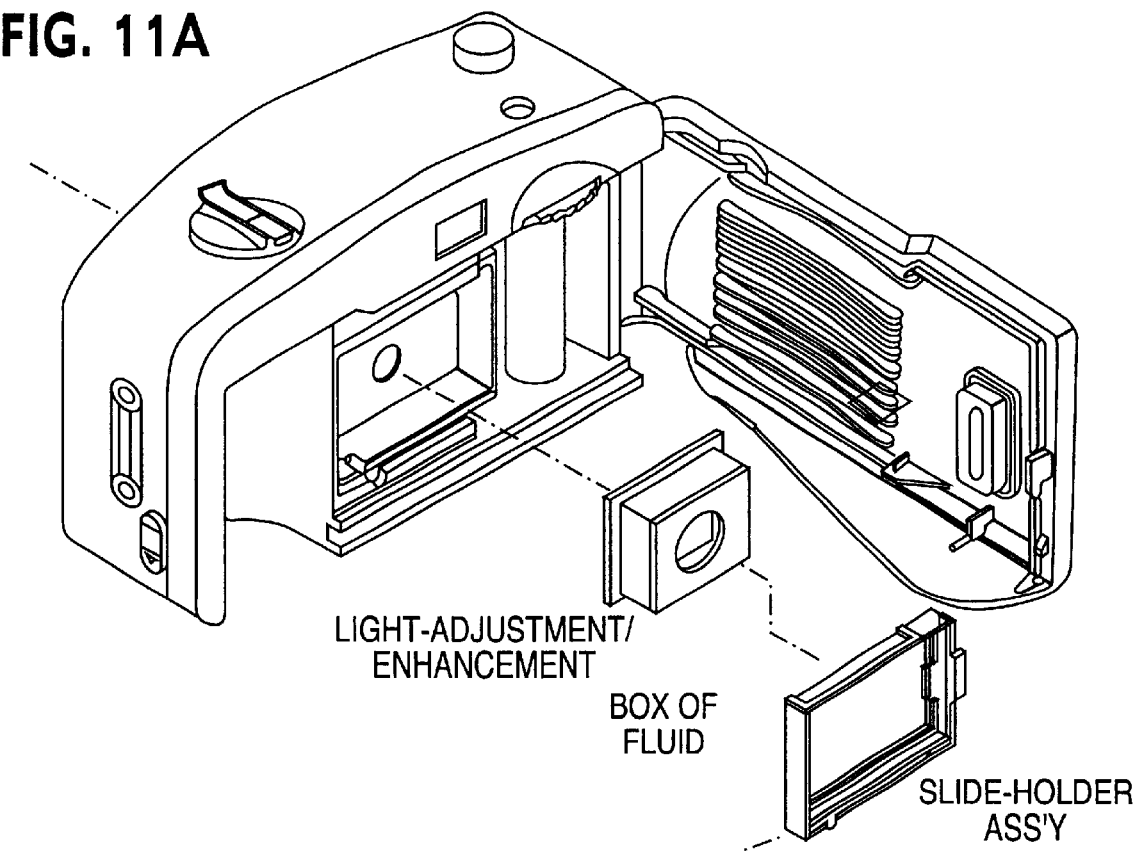
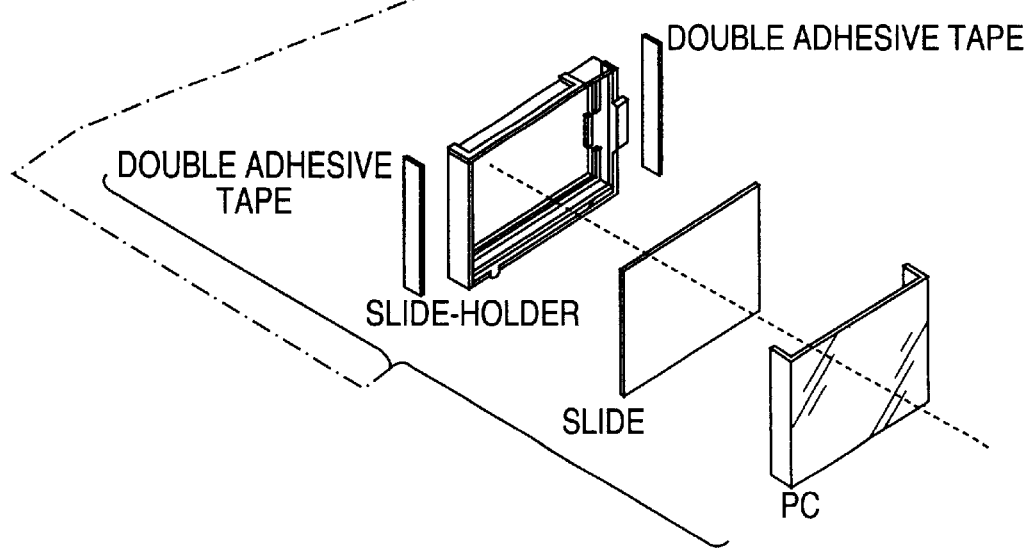

FIG. 11B
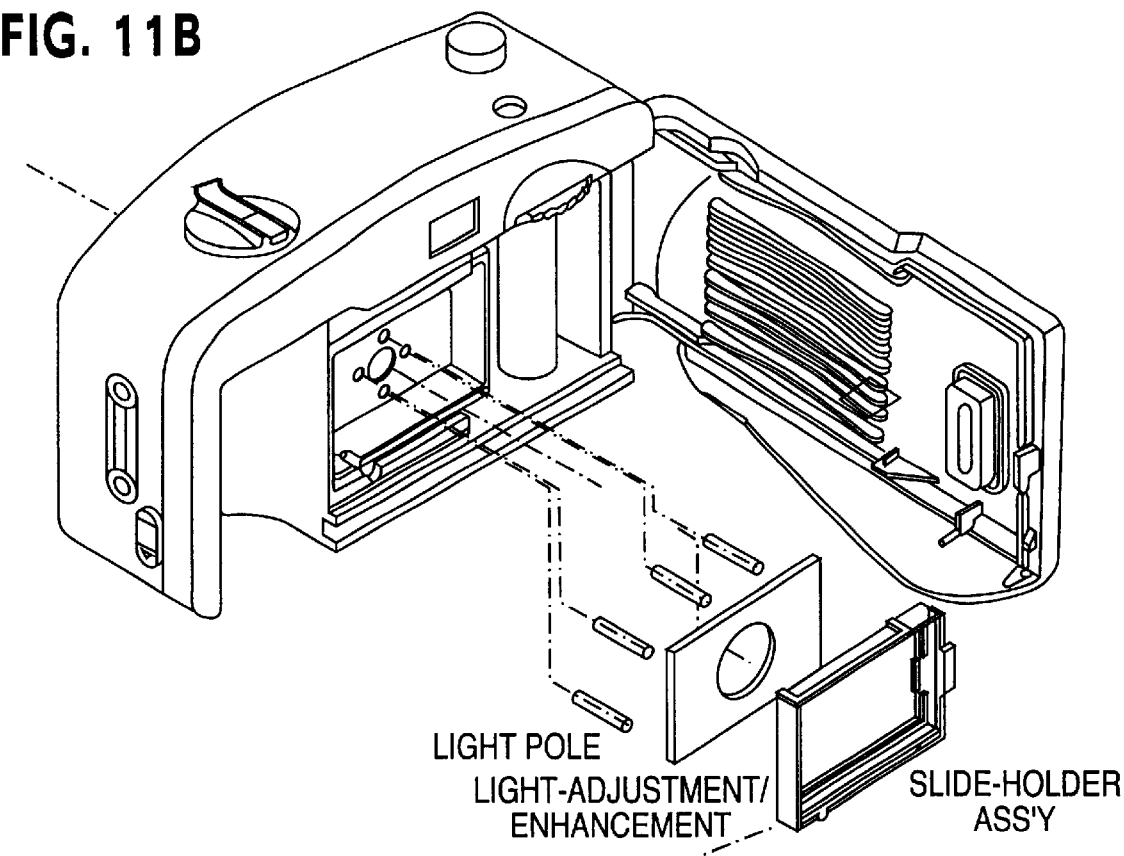
LIGHT POLE
LIGHT-ADJUSTMENT/ENHANCEMENT
SLIDE-HOLDER ASS'Y
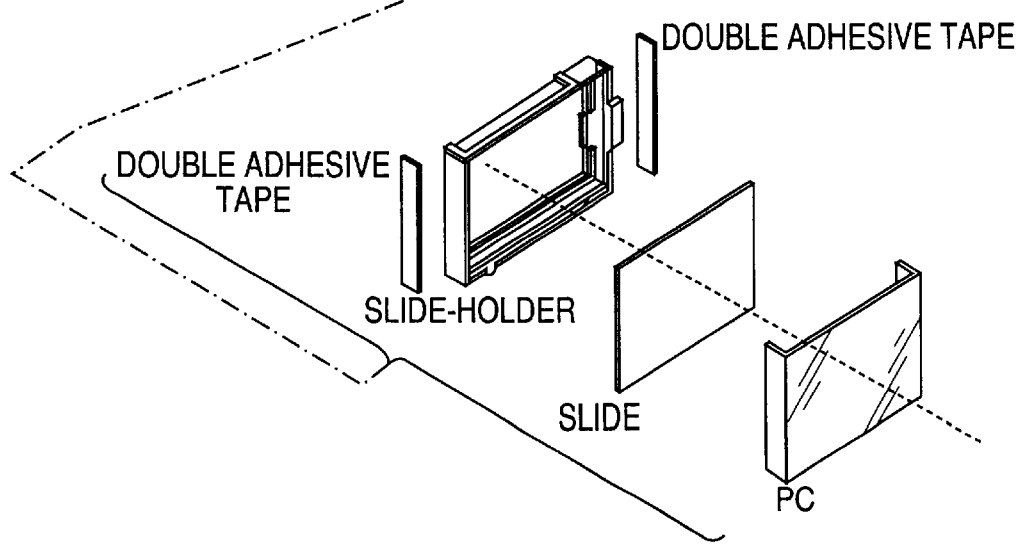
DOUBLE ADHESIVE TAPE
DOUBLE ADHESIVE TAPE
SLIDE-HOLDER
SLIDE
PC

FIG. 11C
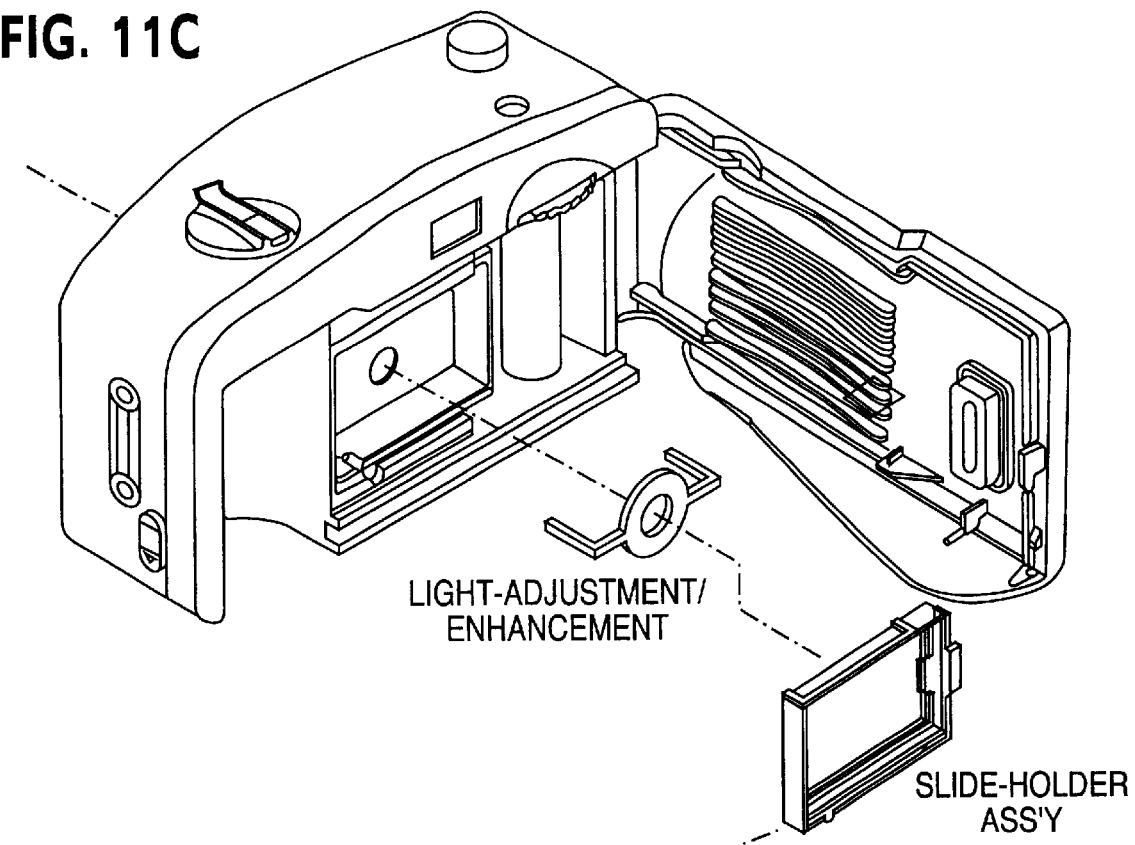
LIGHT-ADJUSTMENT/
ENHANCEMENT
SLIDE-HOLDER ASS'Y
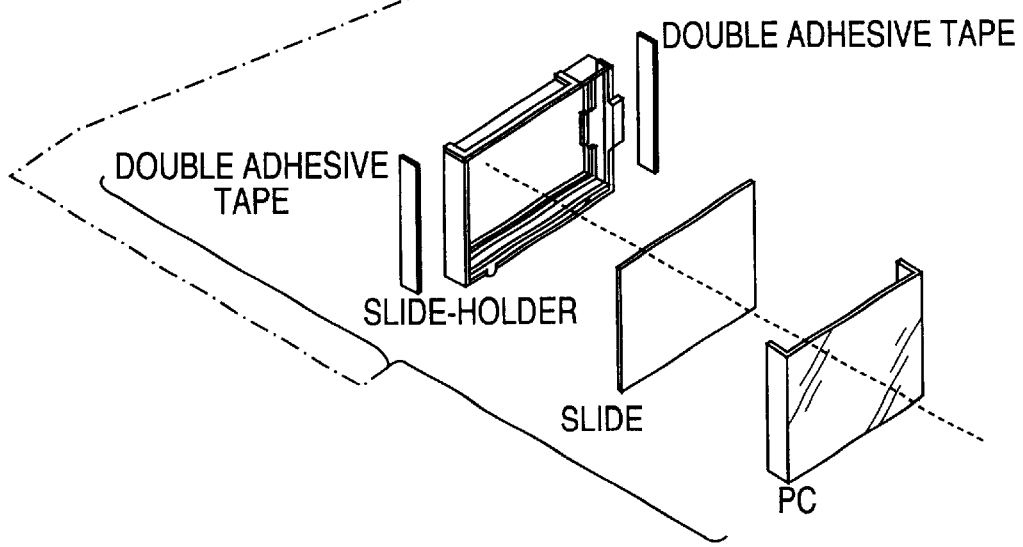
DOUBLE ADHESIVE TAPE
DOUBLE ADHESIVE TAPE
SLIDE-HOLDER
SLIDE
PC

FIG. 11D
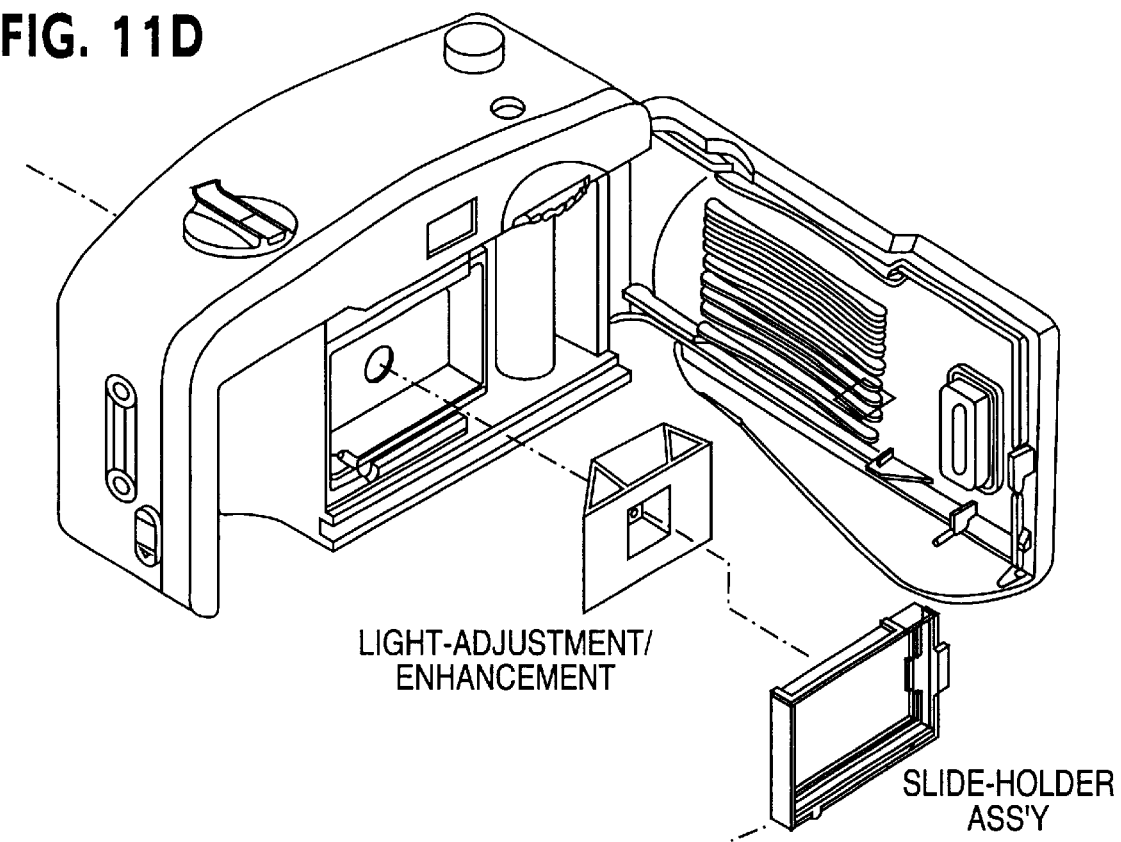
LIGHT-ADJUSTMENT/
ENHANCEMENT
SLIDE-HOLDER ASS'Y
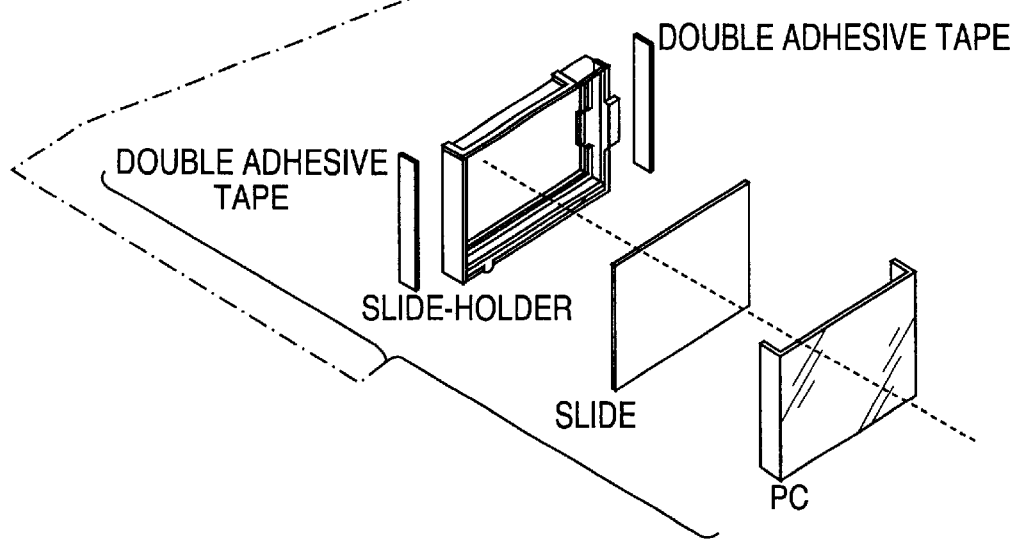
DOUBLE ADHESIVE TAPE
DOUBLE ADHESIVE TAPE
SLIDE-HOLDER
SLIDE
PC

VIEW P

LIGHT ADJUSTING MEANS

SHUTTER OPEN-CLOSE SEQUENCE

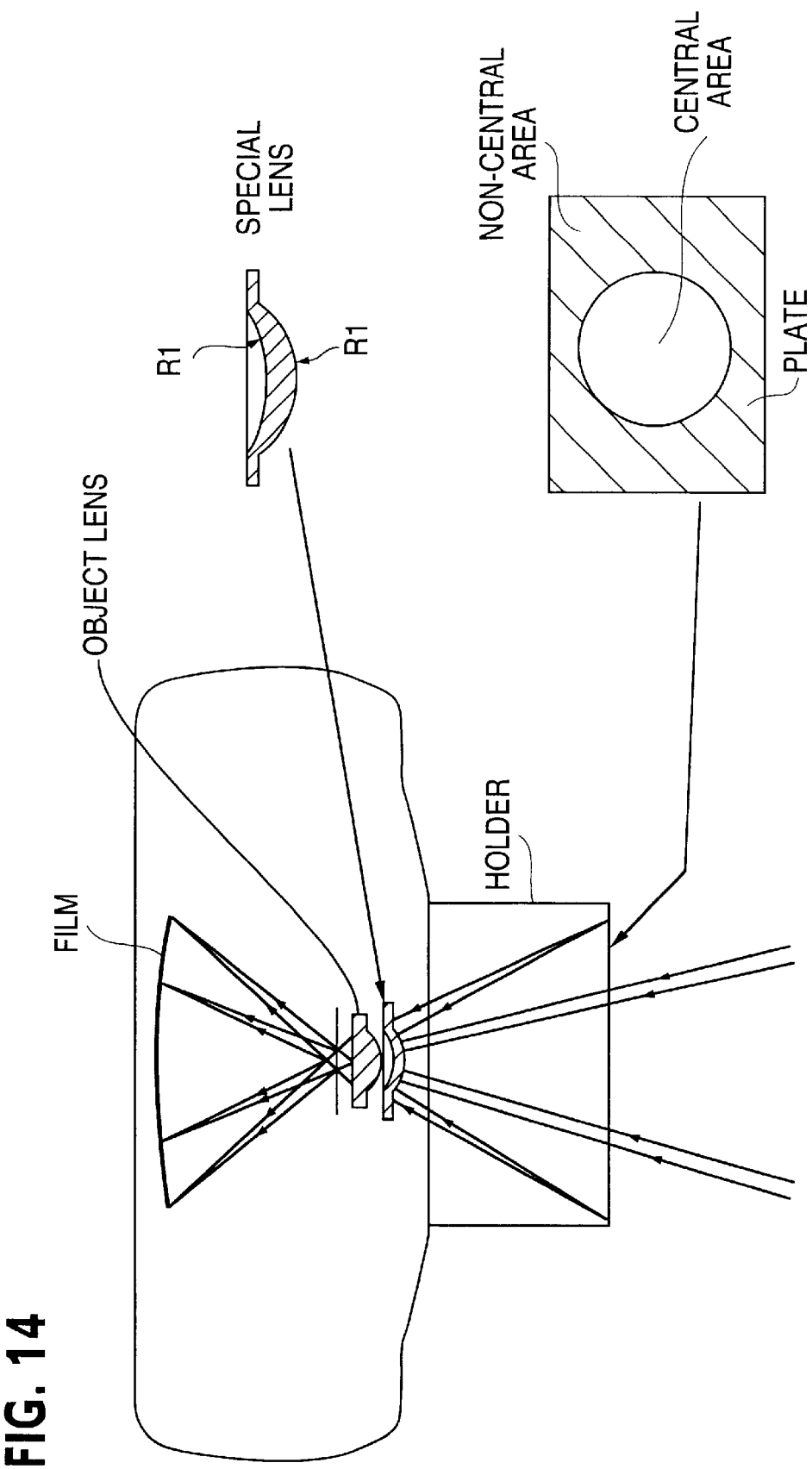

CAMERA

CROSS-REFERENCE TO RELATED APPLICATION

This is a divisional of application Ser. No. 09/177,369, filed Oct. 23, 1998, now U.S. Pat. No. 6,289,181, the entire contents of which are hereby incorporated by reference and for which priority is claimed under 35 U.S.C. §120, and this application claims priority under 35 U.S.C. §119 to Application Nos. 9722586.6 and 9819266.9, filed in the United Kingdom on Oct. 24, 1997, and Sep. 3, 1998, respectively, the entire contents of which are also hereby incorporated by reference.

BACKGROUND OF THE INVENTION

1. Field of the Invention

The present invention relates to a camera and a method for adding an image or pattern to a photograph image.

2. Description of Related Art

When a picture is taken, it is sometimes desirable to add or superimpose a desired image or pattern onto the picture to achieve advertising effects or simply to make the picture more attractive or appealing. The common methods to achieve this are:

1) Post-processing of the film to add an image, words or pattern onto the final photograph.
2) Use of a digital image processing technique together with use of a digital camera or other digitizing means.
3) Shooting of an object against a background screen with a pattern pre-printed or projected onto it.
4) Installation of a filter pre-printed with the desired image or pattern in the camera such that when a picture is taken, light passes through the filter whereby the pre-printed image or pattern is printed on the film. In known cameras that use this arrangement, a number of filters are provided which are pre-printed with images or patterns and can be placed inside a central rectangular recess area of the internal compartment of the camera before mounting the film.

The first two methods, which rely on post-processing, have the disadvantages of being expensive to implement and inconvenient for casual picture taking. The third and the fourth methods both use pure optical methods to achieve the desired result. The third method has the disadvantage of being location dependent and inconvenient. Although the fourth method is inexpensive and convenient to use, it has the disadvantage that the filter cannot be conveniently replaced without replacing the whole roll of film, so that patterns cannot be changed at will within one roll of film.

In the known fourth method in which a filter (or slide) bearing an image or pattern is placed inside the camera between the lens and the film the following problems arise:

1) The pattern can intermix with the background of the object to be shot. If the pattern is colored, a color of the pattern will be changed if it is mixed with the color of the object background. One solution to this problem is to partition the ambient light into one portion for illuminating the pattern and another portion for illuminating the object to be shot. Patent Application No. EP-A-0499742 describes one method of doing this. It uses an area of translucent material placed near the camera aperture allowing only white light to pass through and a dividing structure to isolate the extracted white light from the light constituting the object to be shot.

2) In the method described by patent application No. EP-A-0499742, it is necessary to enlarge the aperture of a standard camera to accommodate and illuminate the translucent material. In so doing, due to the distance travelled by the shutter plate(s), exposure time varies across the film and the photograph so produced will be subject to non-uniform exposure that is undesirable. This problem in fact also occurs in a standard camera although it is generally not noticeable; the problem however is aggravated when the aperture is enlarged.

3) Where a translucent material or other means is used to extract white light from the ambient light, due to the extra dissipation of light energy during the extraction, the intensity of light illuminating the pattern may be insufficient to produce a desirable composite picture.

If a slide (or plate) bearing an image or pattern to be superimposed is placed outside the camera, the desired effect can also be achieved. Two problems need to be resolved in this method:

1) The pattern, being placed at an unusually close position to the lens, needs to be focused properly onto the film.
2) It is necessary to provide appropriate and uniform lighting to the pattern.

SUMMARY OF THE INVENTION

The present invention provides a means for conveniently superimposing patterns onto a photograph using a pure optical method. The main advantage of this invention is that the pattern can be changed at any time during picture taking.

The present application relates to a camera capable of producing photographs that are composite pictures of the object to be shot and a pre-determined image or pattern. In general, the object to be shot would appear in the center part of the picture and the image or pattern would appear in the outer portions surrounding the center part.

The present invention also provides a means of improving the clarity of a pattern superimposed on an image being photographed.

According to a first aspect of the present invention there is provided a camera with an object lens, an aperture and guiding means for an image recording medium, the camera comprising: a means for providing generally scattered or white light to be incident on a first portion of the image recording medium, and a light adjusting means for varying the dissipation of the white or scattered light across the aperture.

Preferably, the means for providing generally scattered or white light is a light diffusing means in the form of a translucent filter. The light adjusting means may vary the dissipation of light in relation to the variation of time of exposure across the aperture. The light adjusting means may vary the dissipation of light in a manner corresponding to the path of a shutter across the aperture.

The camera preferably has an image bearing means, the image of which is to be recorded on the first portion of the image-recording medium. The image bearing means may be disposed between the lens and the guiding means for the image-recording medium.

The light adjusting means may be in the form of a translucent filter of varying thickness, the thickness varying in relation to the time of exposure across the aperture.

The light adjusting means may be in the form of a translucent filter having a portion of the filter with a higher level of diffusion, the portion of the filter extending over a segment of the aperture corresponding to an area first exposed during the opening of a shutter across the aperture.

As another alternative, the light adjusting means may be in the form of a varying surface finish on a translucent filter, to vary the amount of light transmitted through the translucent filter.

As a further alternative, the light adjusting means may be in the form of a translucent fluid, the density or concentration of which is varied.

Preferably, the light diffusing means is in the form of a translucent filter with one of the following forms of diffusing means: a wave-formed surface, a layer of fluid, light focusing means for focusing stray light and out-focusing means.

Preferably, the camera includes a focusing means for focusing light on the light diffusing means.

Preferably, the camera includes a focusing means for focusing light on the image bearing means.

Further, the camera may preferably include a light enhancement means for enhancing the light incident on the first portion of the image-recording medium.

The first portion of the image-recording medium may be the surrounding portion, surrounding the object image bearing center portion.

According to a second aspect of the present invention, there is provided a device suitable for use with a camera, the device comprising a means for providing generally scattered or white light in a first portion and a light adjusting means for varying the dissipation of the white or scattered light across the first portion.

A device suitable for use with a camera with any of the features of the first aspect of the present invention. The device may be in the form of an attachment for a camera.

According to a third aspect of the present invention, there is provided a camera with an aperture and guiding means for an image recording medium, the camera having a lens system including an object lens for focusing light from an object to be photographed on an image recording medium and a second focusing means for focusing light from a member disposed in front of or behind the object lens on the image recording medium.

The lens system may be in the form of a single lens. Alternatively, the lens system has two or more lenses.

The second focusing means may focus light from an image bearing means. The second focusing means may focus light from a light diffusing means in the form of a translucent filter.

Preferably, the camera includes light adjusting means for varying the dissipation of light across the aperture in relation to the exposure time across the aperture.

Preferably, the camera includes a light enhancement means for enhancing the light incident on the image-recording medium.

According to a fourth aspect of the present invention there is provided a camera with a lens having a means for holding an image in front of the lens and outside the camera, wherein the lens system is arranged to focus light from the image on an image recording medium and to focus light from an abject to be photographed on the image recording medium.

Preferably, the means for holding an image is a plate supported in front of the lens of the camera.

According to a fifth aspect of the present invention there is provided a camera comprising a lens system formed of an object lens and an additional focusing means wherein the additional focusing means has a first area and a second area, wherein the second area has a focal length shorter than the focal length of the first area such that the lens system can focus light from an image relatively close to the lens system as well as from the object to be photographed.

The additional focusing means with a non-uniform focal length may have an aperture or window providing the first area of infinite focal length.

Preferably, the first area of the additional focusing means has an infinite focal length or a focal length that does not affect the operation of the object lens.

Preferably, the additional focusing means with a non-uniform focal length is an aspheric lens. Preferably, the first area is a central area of the additional focusing means.

Optimally, the second area with a relatively short focal length has a focal length of approximately 10mm.

Preferably, a means for holding an image is provided at the focal length of the second area of the additional focusing means. Preferably, the means for holding an image is a plate provided with an image.

Preferably, the image is provided on the surface of the plate facing the additional focusing means.

Preferably, the means for holding an image has an aperture corresponding to the first area of the additional focusing means. The means for holding an image may have a second aperture corresponding to a viewfinder of the camera.

Preferably, a light source is provided for illuminating the means for holding an image.

Preferably, a holder is provided in front of the lens system in which the means for holding an image is supported. The holder may have features as defined in the first, second and/or third aspects of the present invention.

The additional focusing means with a non-uniform focal length may be supported in or be integral with the holder in a position, in use, between the means for holding an image and the object lens of the camera. Preferably, additional focusing means with a non-uniform focal length is positioned at a back wall of the holder.

Preferably, the holder has diamond shaped corrugated features allowing multiple refractions of light.

Preferably, the plate is in the form of a sheet of plastics material. Preferably, the plate is white.

Preferably, the holder is of white coloured plastics material. Preferably, the holder has a black filter adjacent the light source for uniform distribution of light from the light source.

The lens system may have two lenses, an object lens and the additional focusing means in the form of a lens with a non-uniform focal length, the two lenses being separately removable. Alternatively, the lens system may incorporate the additional focusing means in the object lens.

According to a sixth aspect of the present invention, there is provided a method for superimposing an image on a photograph using a camera with a lens system including an object lens for focusing light from an object to be photographed on a recording medium, the method comprising providing an image to be superimposed in front of the lens system, focusing light from the image onto the recording medium.

According to a seventh aspect of the present invention, there is provided a camera with an object lens, an aperture and guiding means for an image recording medium, the camera having light enhancement means to increase the light incident on the image recording medium.

Preferably, the camera has an image bearing means in front of or behind the lens.

Preferably, the camera has a light diffusing means in the form of a translucent filter for diffusing light to be incident on a first portion of the image-recording medium.

Preferably, the camera includes a light adjusting means for varying the dissipation of light across the aperture in relation to the exposure time across the aperture.

Preferably, the camera includes a focusing means for focusing light on the image bearing means or on the light diffusing means.

The light enhancement means may be in the form of conducting poles. Alternatively, the light enhancement means may be in the form of reflective elements.

According to an eighth aspect of the present invention there is provided a device suitable for use with a camera, the device comprising a light enhancement means to increase the light incident on an image recording medium of the camera.

The device suitable for use with a camera may have any of the features of the seventh aspect of the present invention.

According to a ninth aspect of the present invention there is provided a camera with a lens and a guiding means for an image recording medium, the camera comprising: a support means disposed in front of the lens of the camera; a plate supported in the support means a predetermined distance from the lens; and a filter disposed between the lens and the guide means for an image recording medium; wherein the plate has a window through which the lens can receive light from an object to be photographed.

Preferably, the window is an aperture. Preferably, the plate is of white material at least on a surface opposite the lens. Preferably, the plate is a white plastics material.

Preferably, the support means is in the form of a holder with side walls. The plate may be supported in the holder by the side walls. Preferably, the holder is formed of a white plastics material.

Preferably, the support means has an aperture corresponding to the position of the lens. Preferably, a second aperture is provided in the support means for a viewfinder of the camera. Preferably, the plate has a second aperture corresponding to a viewfinder of the camera. Preferably, the holder has an additional wall between the two apertures.

Preferably, the holder has an aperture in one of the side walls adjacent a flashlight of the camera to allow the ingress of light. Preferably, the side wall of the holder adjacent the flashlight has a black colored inside surface.

Preferably, the holder snap fits onto the camera.

The guiding means for an image-recording medium may be adapted to guide a frame of a film behind the lens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Specific embodiments of cameras in accordance with the present invention are now described by way of examples only with reference to the accompanying drawings in which:

FIG. 5B is an exploded view of a camera corresponding to the ray diagram of FIG. 5A;

Figure 7A:
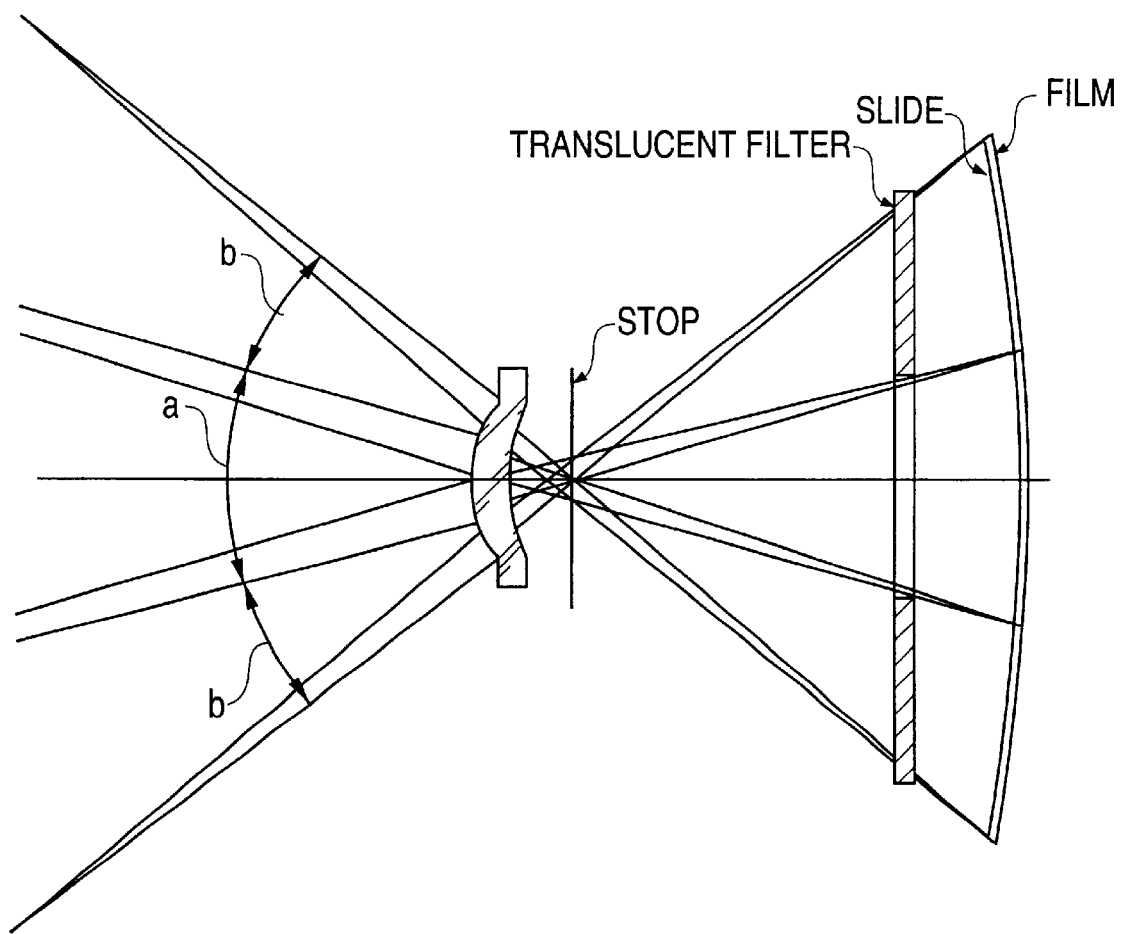
FIG. 7A is a ray diagram of a light path for a camera with an internal image bearing means and an internal translucent filter in accordance with the present invention.
Figure 7B:
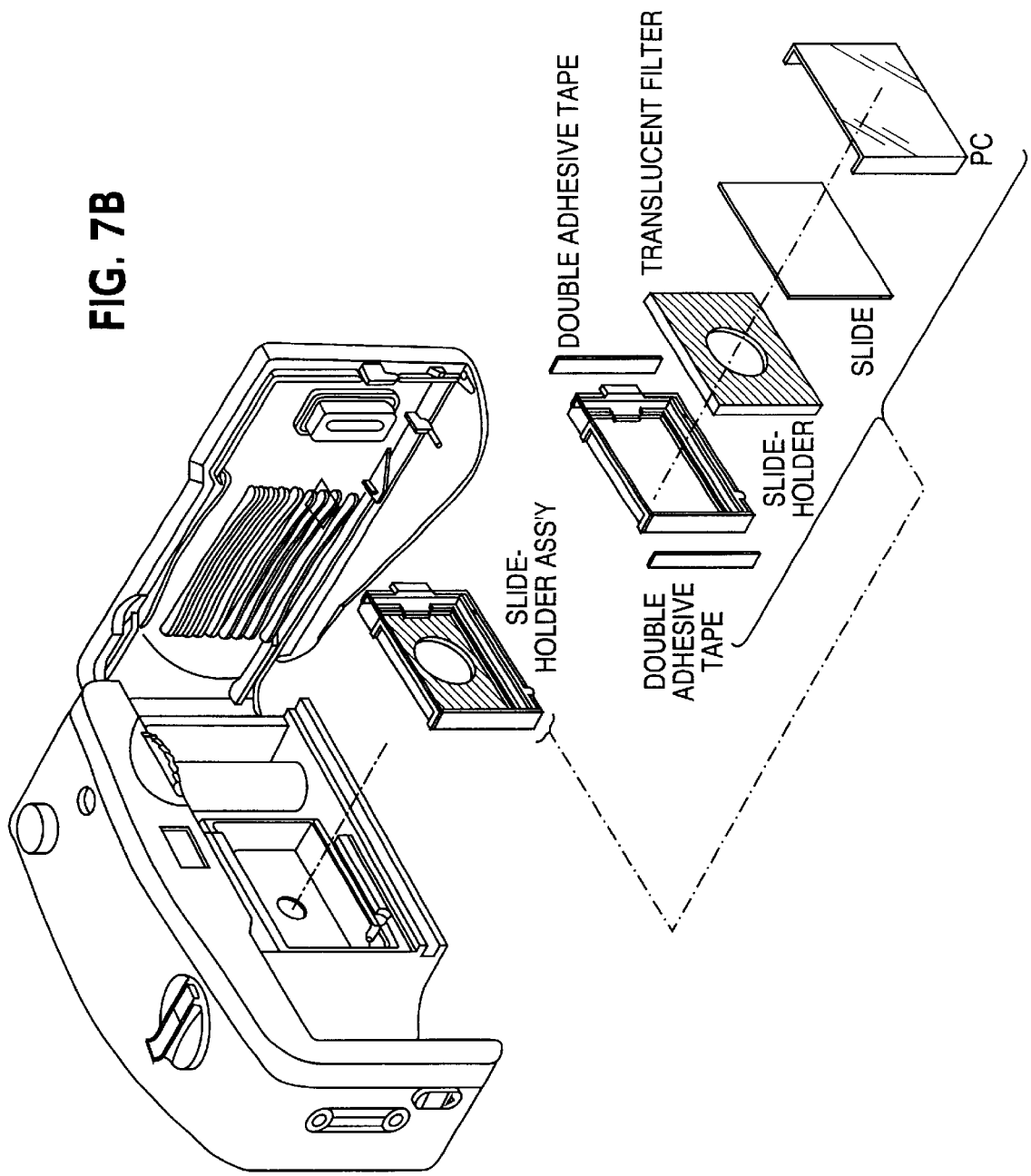
FIG. 7B is an exploded view of a camera corresponding to the ray diagram of FIG. 7A.
Figure 7C:
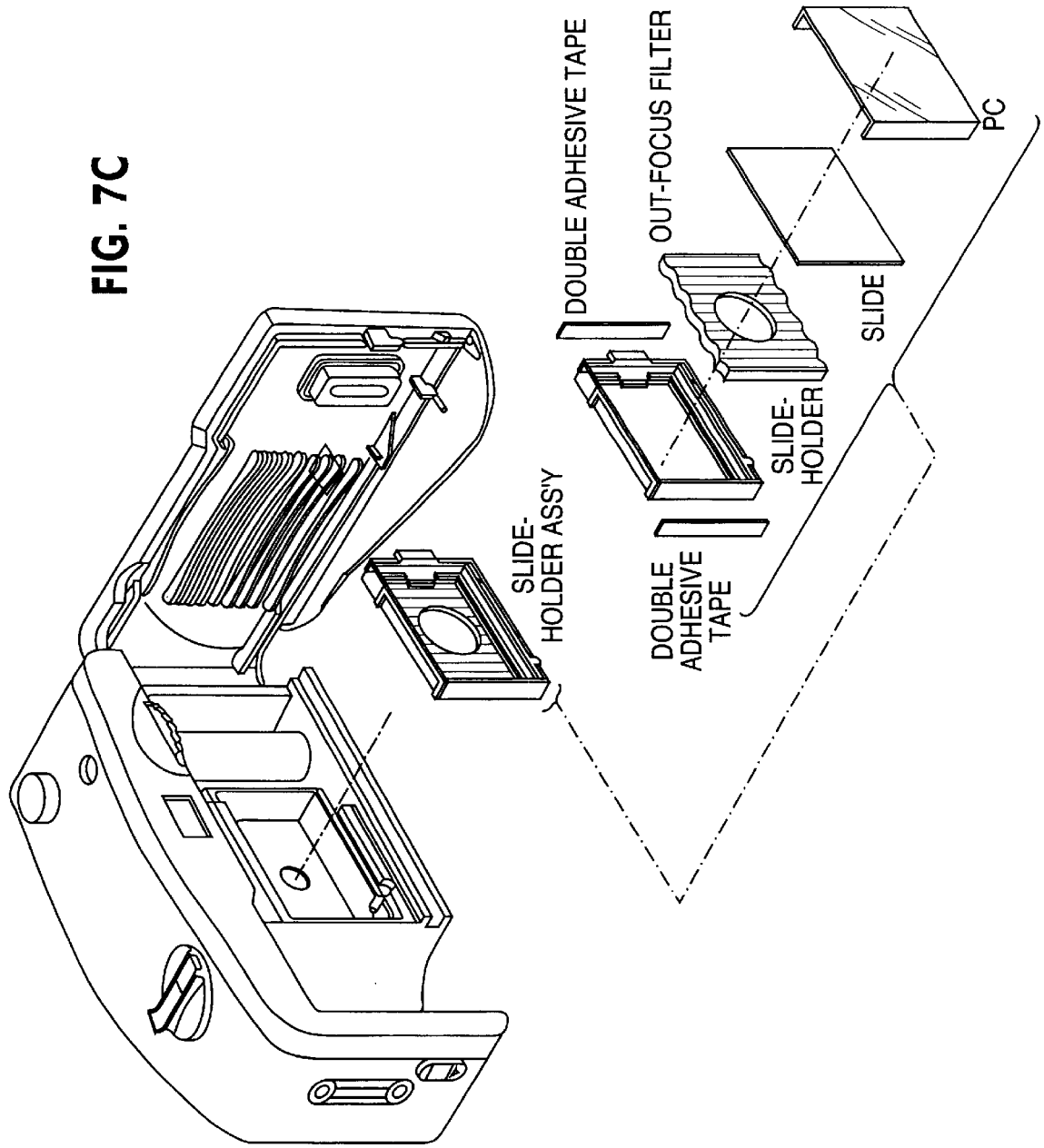
FIG. 7C is a second embodiment of a camera corresponding to the ray diagram of FIG. 7A.
Figure 7E:
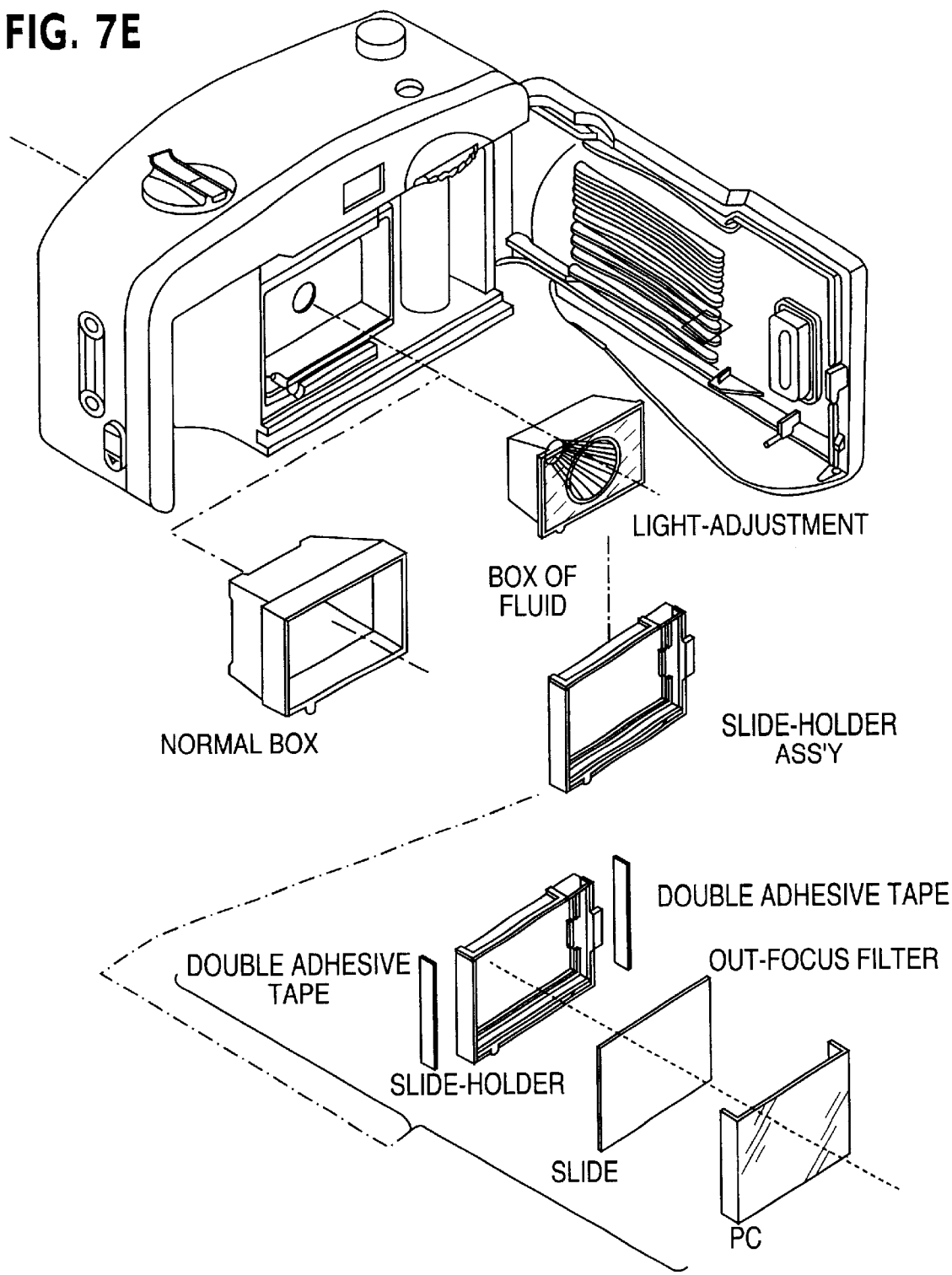
Figure 7G:
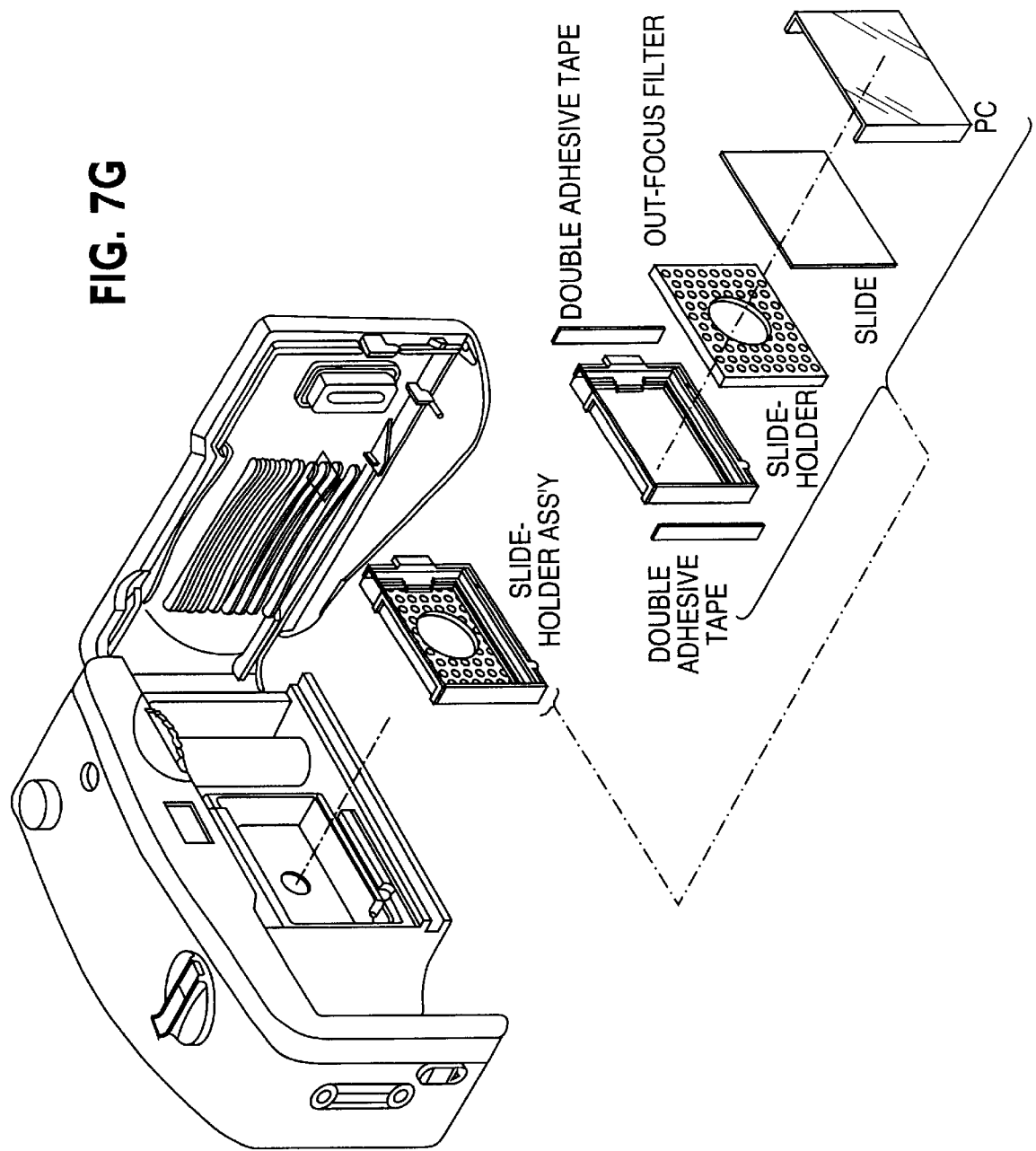
Figure 8A:
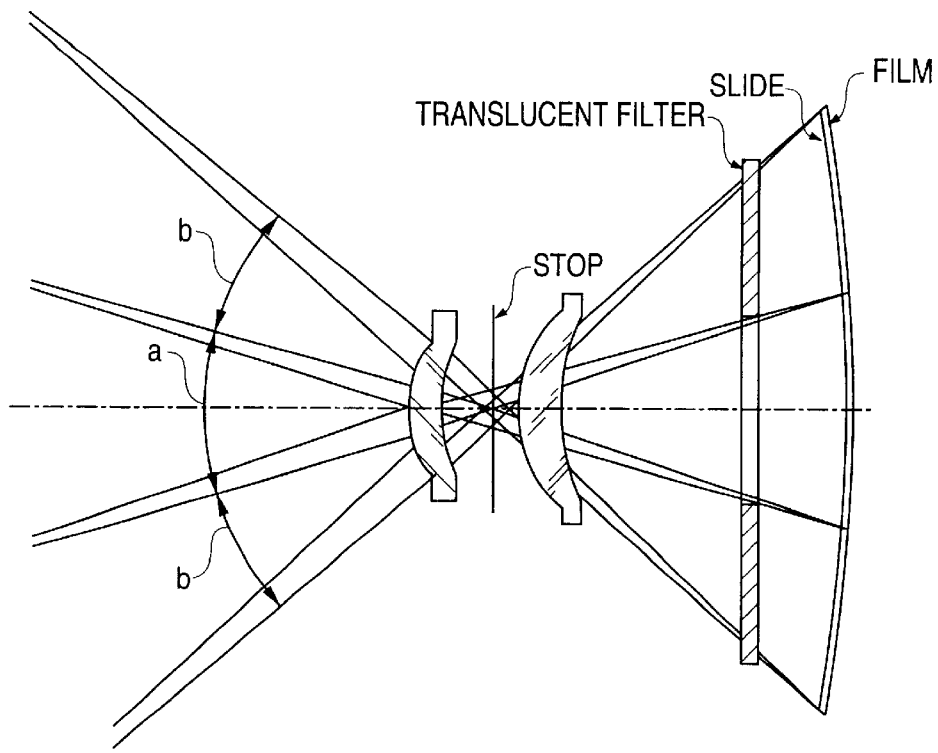
Figure 9A:
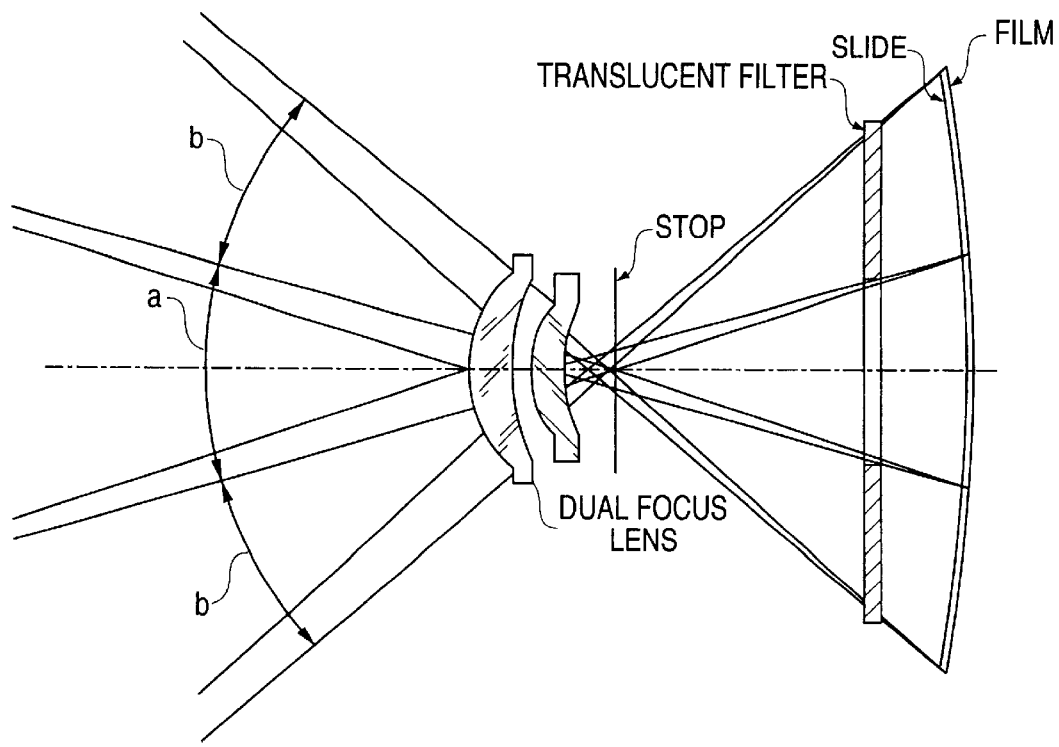
Figure 8B:
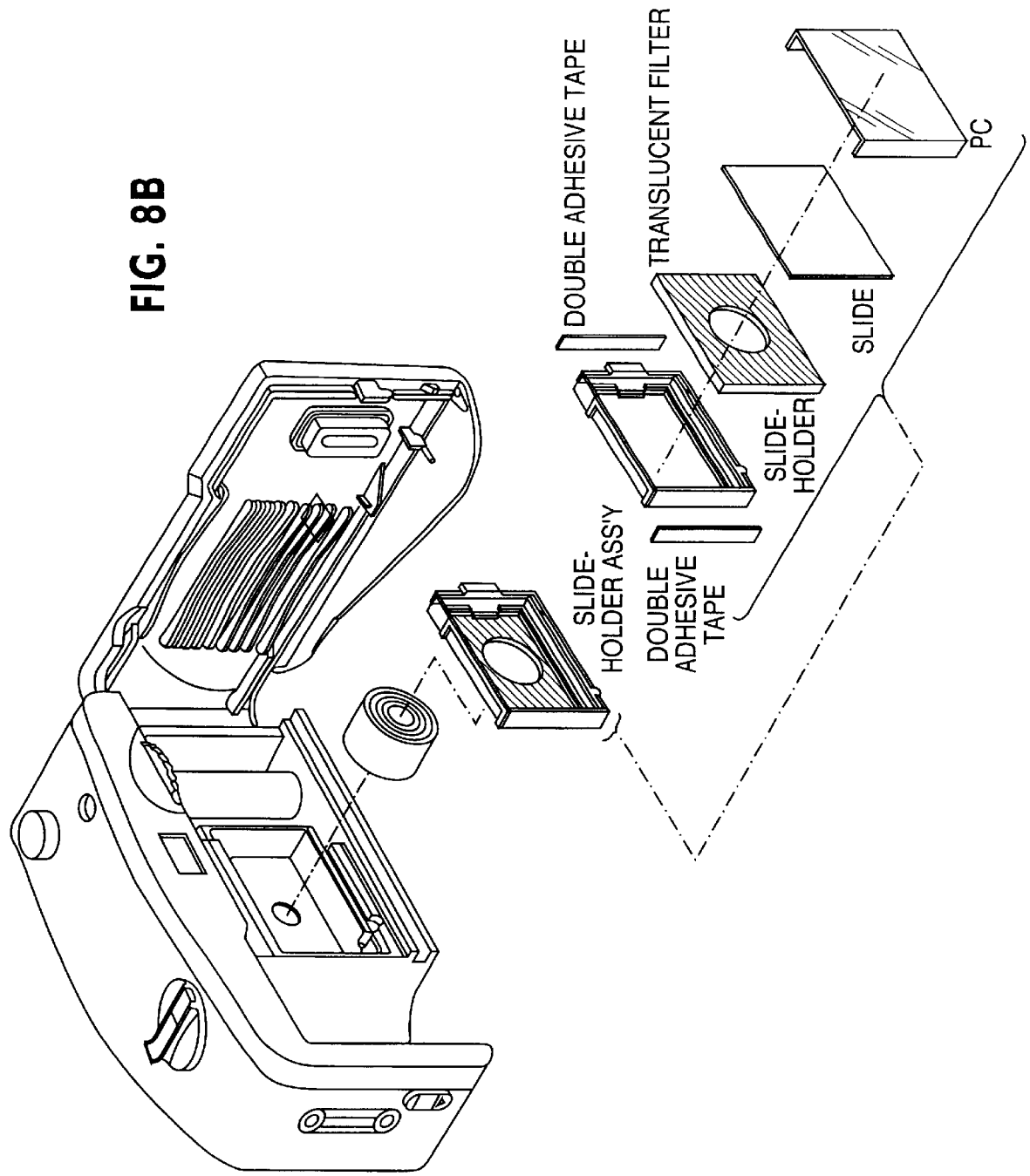
Figure 10A:
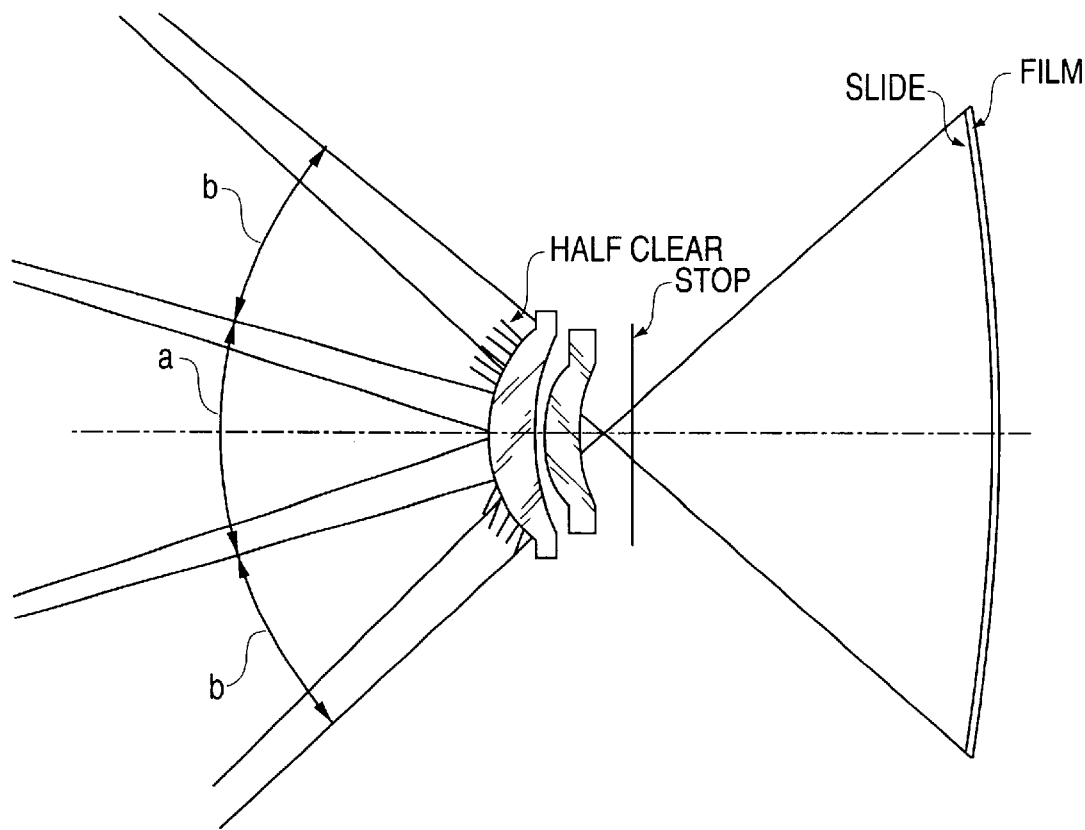
Figure 10B:
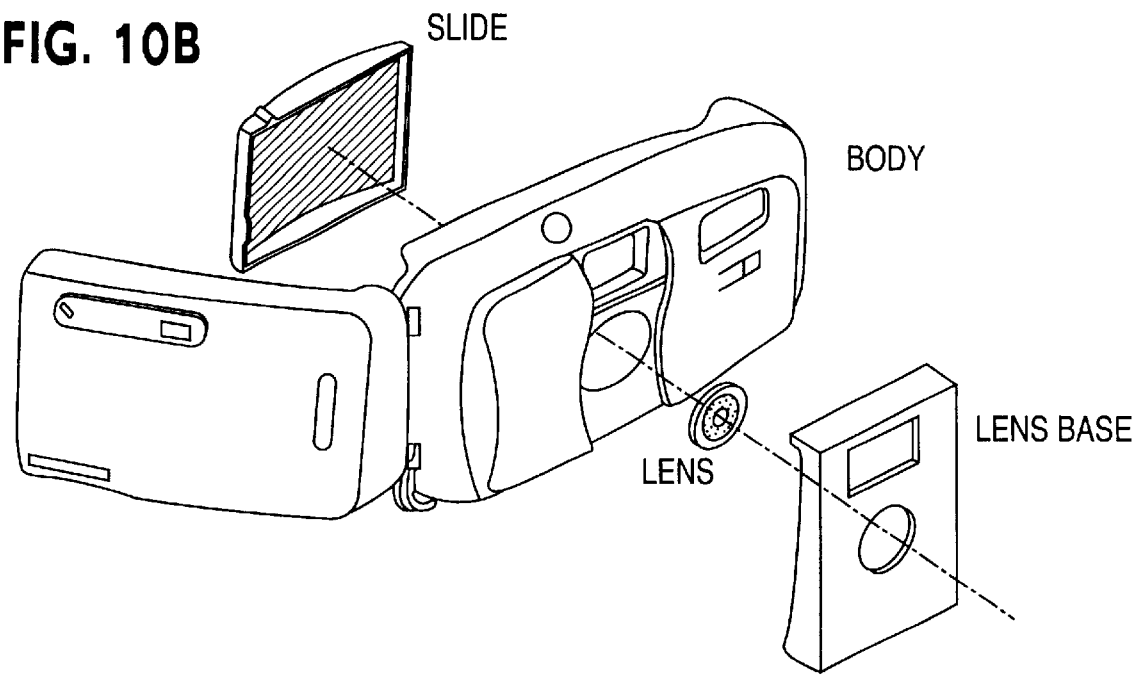
Figure 12A:
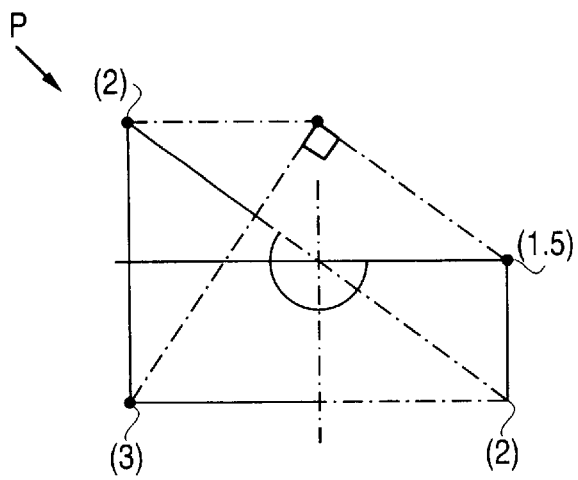
Figure 12B:
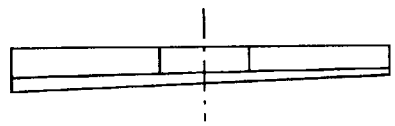
Figure 12C:
Figure 12D:
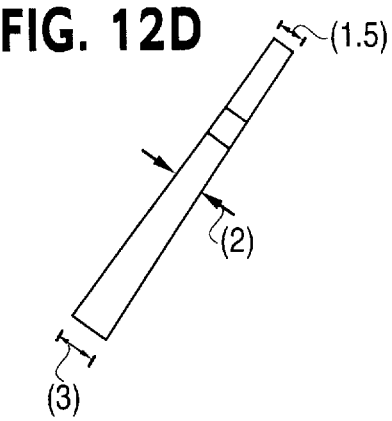
Figure 15A:
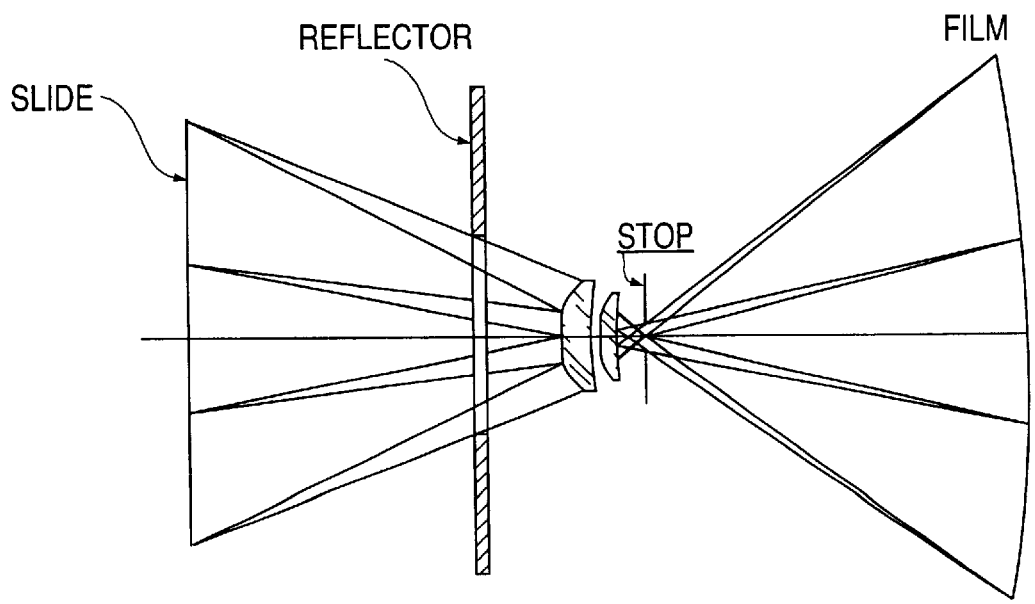
Figure 13A:
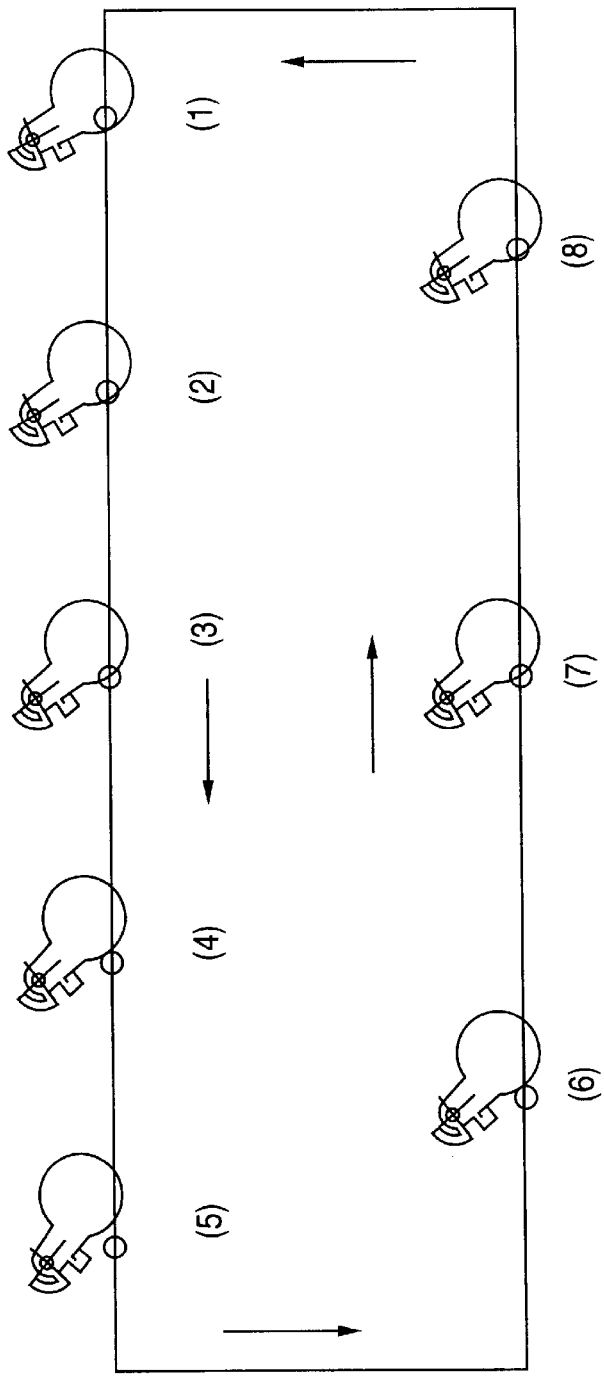
Figure 13C:
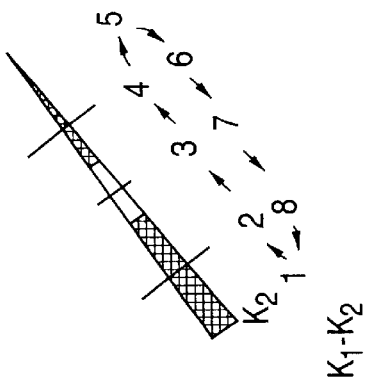
Figure 13B:
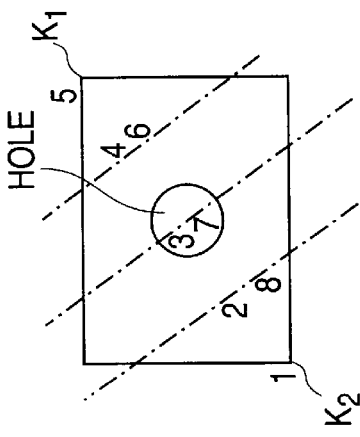
Figure 15B:
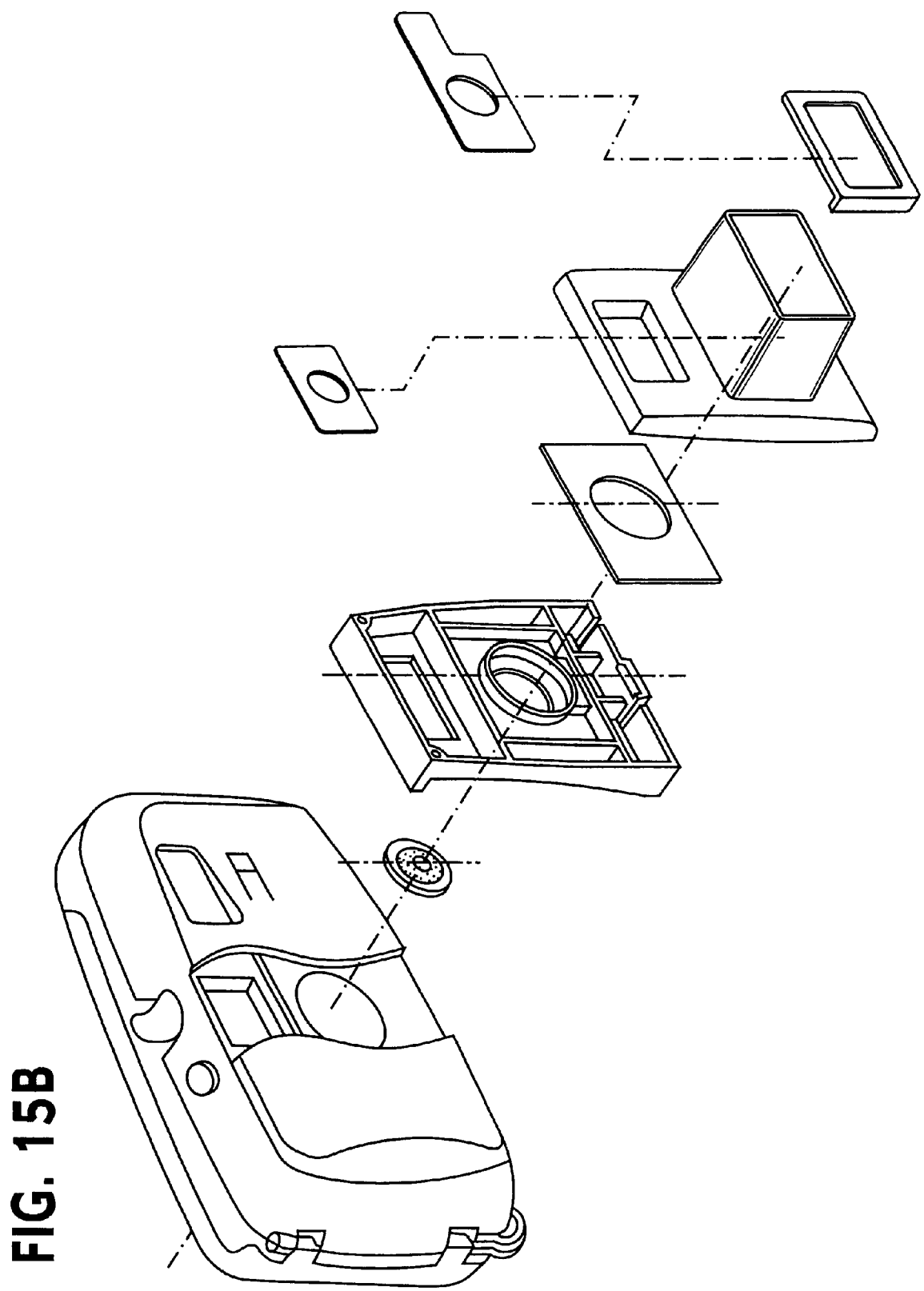
Figure 16:
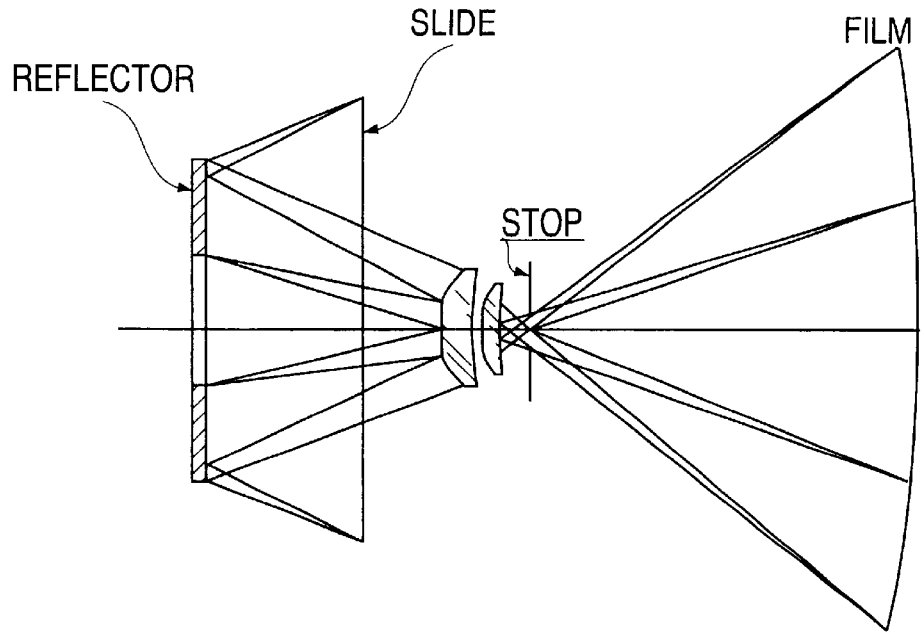
Figure 17A:
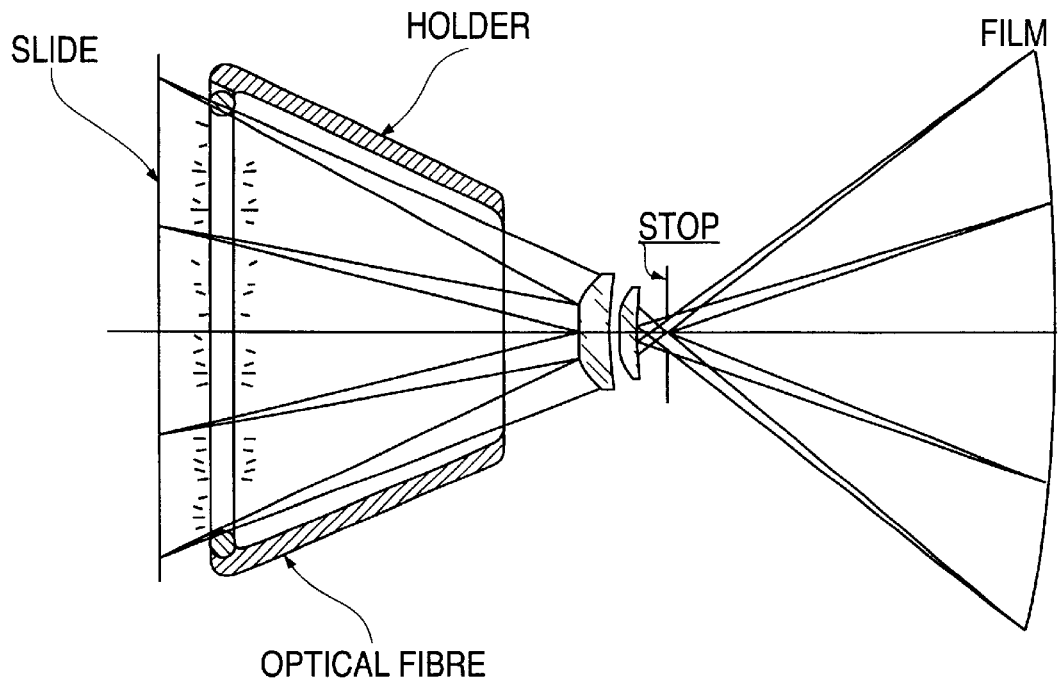
Figure 17B:
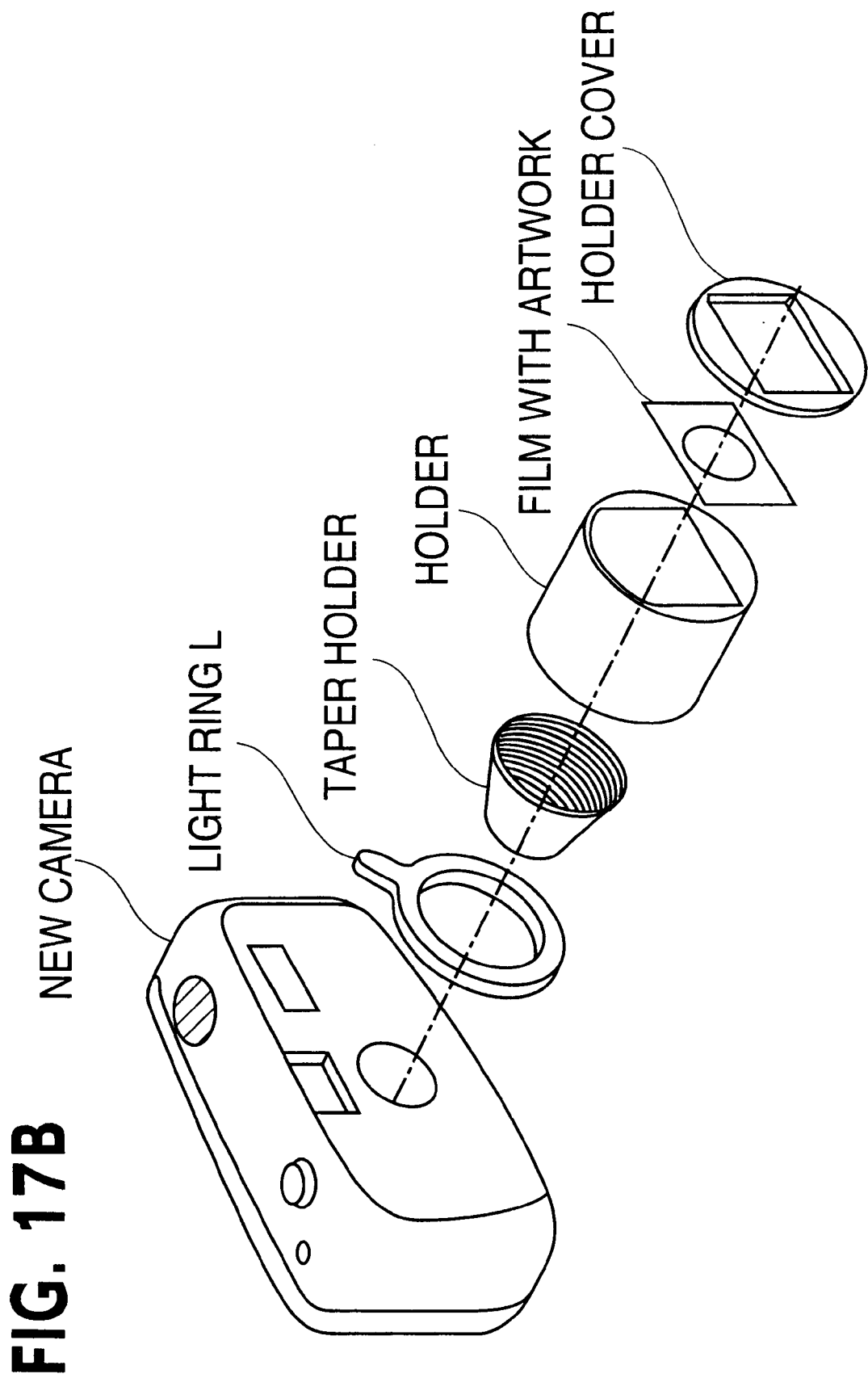

FIG. $7D_1$ is a third embodiment of a camera corresponding to the ray diagram of FIG. 7A;

FIG. $7D_2$ is a detail of FIG. $7D_1$;

FIG. $7D_3$ is a cross-section along I—I in FIG. $7D_2$;

FIG. $7D_4$ is a cross-section along II—II in FIG. $7D_2$;

FIG. 7E is a fourth embodiment of a camera corresponding to the ray diagram of FIG. 7A;

FIG. 7F is a fifth embodiment of a camera corresponding to the ray diagram of FIG. 7A;

FIG. 7G is a sixth embodiment of a camera corresponding to the ray diagram of FIG. 7A;

FIG. 7H is a seventh embodiment of a camera corresponding to the ray diagram of FIG. 7A;

FIG. 8A is ray diagram showing a light path for a camera with an internal image bearing means, an internal translucent filter and an internal dual focus means in accordance with the present invention;

FIG. 8B is an exploded view of a camera corresponding to the ray diagram of FIG. 8A;

FIG. 9A is ray diagram showing a light path for a camera with an internal image bearing means, internal translucent filter and external dual focus means in accordance with the present invention;

FIG. 9B is an exploded view of a camera corresponding to the ray diagram of FIG. 9A;

FIG. 10A is a ray diagram showing a light path for a camera with an internal image bearing means, translucent filter on the lens and a dual focus means in accordance with the present invention;

FIG. 10B is an exploded view of a camera corresponding to the ray diagram of FIG. 10A;

FIG. 11A is an exploded view of a camera with an internal image bearing means and light enhancement means in accordance with the present invention;

FIG. 11B is an exploded view of a second embodiment of a camera with an internal image bearing means and light enhancement means in accordance with the present invention;

FIG. 11C is an exploded view of a third embodiment of a camera with an internal image bearing means and light enhancement means in accordance with the present invention;

FIG. 11D is a fourth embodiment of a camera with an internal image bearing means and light enhancement means in accordance with the present invention;

FIG. 12 is an embodiment of a light adjustment means in accordance with the present invention;

FIGS. 13A, 13B and 13C are diagrammatic representations of the operation of a shutter of a camera with a light adjustment means in accordance FIG. 12;

FIG. 14 is a camera with an external image bearing means and a dual focus in accordance with the present invention;

FIG. 15A is a ray diagram showing a light path for a camera with an external image bearing means and a reflector in accordance with the present invention;

FIG. 15B is an exploded view of a camera corresponding to the ray diagram of FIG. 15A;

FIG. 16 is a ray diagram showing the light path of a camera with external image bearing means and a reflector in accordance with the present invention;

FIG. 17A is a ray diagram of a light path for a camera with an external image bearing means and light conducting means in accordance with the present invention; and FIG. 17B is an exploded view of a camera corresponding to the ray diagram of FIG. 17A.

DESCRIPTION OF PREFERRED EMBODIMENTS

Internal Image Bearing Means

Figure 3A:
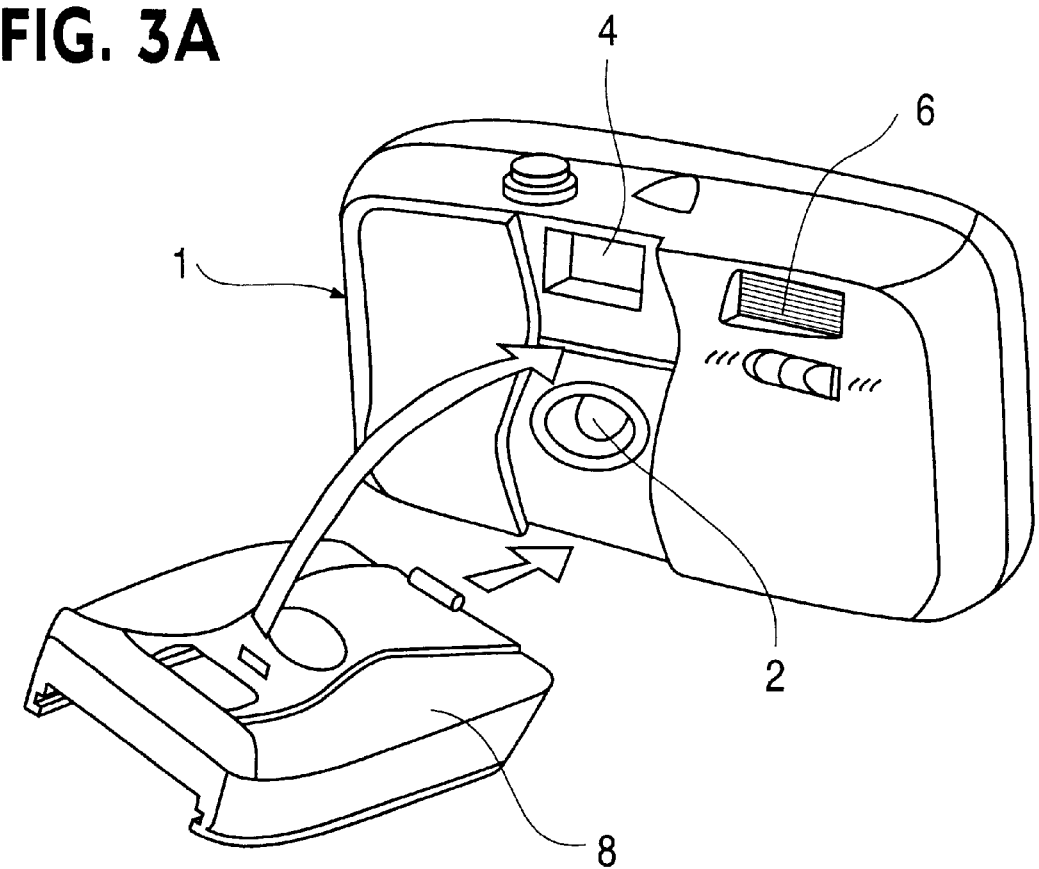
FIGS. 3A and 3B are perspective views of a camera with a holder in accordance with the present invention FIG. 4 a camera with an internal image bearing means and an external plate in accordance with the present invention.
Figure 3B:
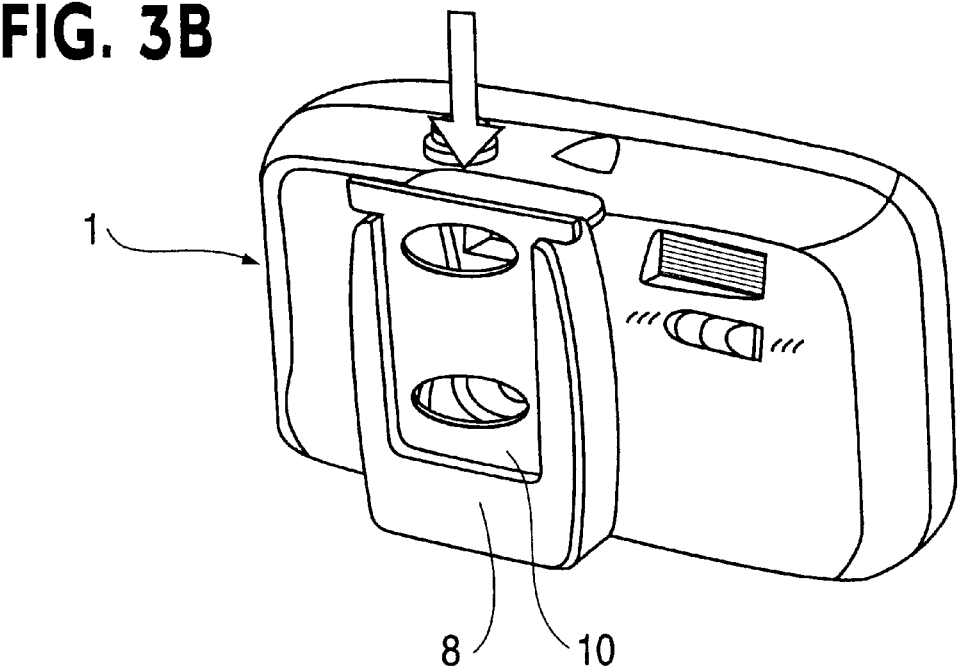

In a first embodiment, a camera is provided with an external plate for clarifying an image to be superimposed on a photograph. The camera may have an internal image bearing means. Referring to the drawings, camera 1 as shown in FIGS. 3A and 3B is provided with a lens 2 and a viewfinder 4. Light from an object to be photographed travels through the lens 2 and is recorded on a film. The camera 1 also has a flashlight 6.

Figure 4:
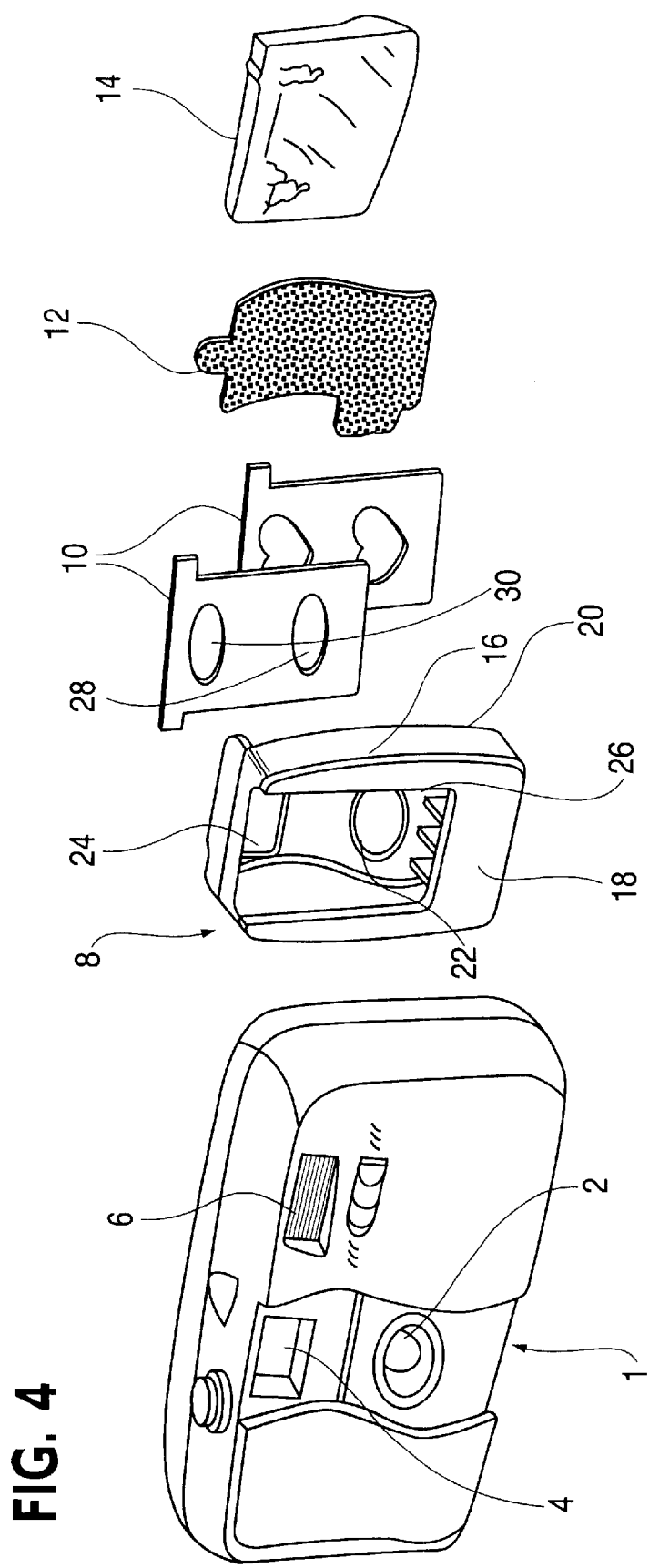

A holder 8 is provided for attachment to the front of the camera 1. Referring to FIG. 4, the holder 8 has side walls 16, a back wall 20 and a front wall 18. The holder 8 snap fits onto the front of the camera 1 for easy attachment and removal. The back wall 20 of the holder 8 has a first aperture 22 corresponding to the position of the lens 2. The back wall 20 of the holder 8 has a second aperture 24 corresponding to the position of the viewfinder 4. The holder 8 is formed of a white plastics material.

The front wall 18 of the holder 8 has an opening 26 in which a plate 10 is positionable. The opening 26 is rectangular and greater in size than the first and second apertures 22, 24 in the back wall 20 of the holder 8. The plate 10 can be held in the holder 8 by grooves in opposite sides of the rectangular opening 26.

The plate 10 is formed of a white or light colored plastics material. The plate 10 has a first aperture 28 corresponding to the first aperture 22 in the back wall 20 through which light can pass to the lens 2 from an object being photographed. The plate 10 also has a second aperture 30 corresponding to the viewfinder 4 and the second aperture 24 in the back wall 20.

The apertures 28, 30 in the plate 10 can be of varying shapes for different visual effects.

One side wall 16 of the holder 8 is adjacent the flashlight 6 which is provided on the front of the camera 1. The inside surface of the side wall 16 is black colored to improve the diffusion of light from the flashlight 6 within the holder 8.

A slit is provided in the side wall 16 adjacent the flashlight 6 to allow light from the flashlight 6 to enter the holder 8.

An additional wall is provided between the first apertures 22, 28 of the back wall 20 and the plate 10 and the second apertures 24, 30.

An optional colored filter 12 is provided for placing in front of the lens 2 of the camera 1.

The holder 8 can be used with a camera 1 using an internal filter 14 as known from the prior art. The filter 14 provides an image or pattern to be superimposed on the photograph. The filter 14 is positioned in the camera and the film is placed over the filter 14 such that the filter 14 is disposed between the film and the lens 2.

The provision of the holder 8 with the white plate 10 means that light from the plate 10 passes through the lens 2 and the filter 14 and the image or pattern on the filter 14 is clarified as it is superimposed over a white area corresponding to the area of the plate 10. In this embodiment, the plate 10 has a central aperture 28, which can be round or alternatively shaped, thus the filter 14 is clarified around the central image of the object being photographed.

Light from the flashlight 6 illuminates the plate 10. The material of the plate 10 and the holder 8 allow light to pass through. The diffusion of the light within the holder 8 is improved by the provision of the black inside surface of the wall adjacent the flashlight 6. The flashlight 6 can be used in daylight as well as in poor light resulting in a good image.

The image to be superimposed on a photograph can be clarified by partitioning light incident on a first portion of the image recording medium on which the image is to be superimposed and the light incident on a second portion of the image recording medium on which the object to be photographed is to be recorded. The light partitioning can be achieved by way of a light partitioning means that can be placed either inside or outside the camera. The problem of non-uniform exposure across the image-recording medium can be addressed by way of a light adjusting means that can be disposed either inside or outside the camera.

The light partitioning means can be a translucent filter having a central opening (which can be of any shape). More generally, the "translucent" part can be any means by which light rays passing through it are out-focused so that the resultant light rays do not constitute any visible object; in this way the "translucent" part produces essentially white light. One way of producing a "translucent" part is by way of surface finishing the filter such as by grinding. The specific embodiments given below describe some other possible ways of producing a "translucent" part.

The light adjusting means dissipates light energy passing through it as a function (in the mathematical sense) of the time of exposure, so that the longer the time of exposure, the more light energy will be dissipated. The result is that light exposure is made as uniform as possible across the film. Possible methods of implementing a light adjusting means, as described in some of the specific embodiments given below, include: (1) varying the thickness of the "translucent" material, (2) varying the degree of surface finishing of the "translucent" material, and (3) varying the concentration of the "translucent" material, which can be a fluid (gaseous or liquid).

The problem of insufficient lighting for the pattern is also addressed by the an aspect of the present invention by way of a light focusing means for focusing stray light onto the pattern, and/or by way of a light enhancement means allowing or channelling the maximum amount of stray light to reach the pattern.

(1) External Light Partitioning Means

Figure 5A:
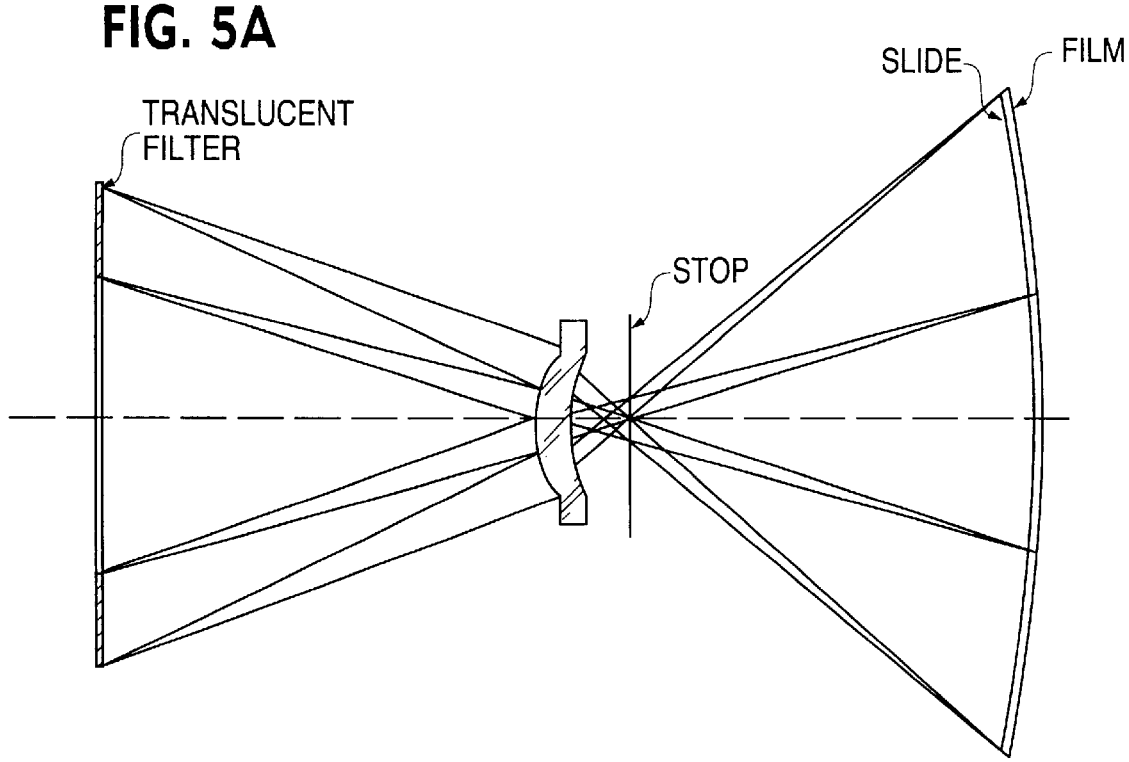
FIG. 5A is a ray diagram showing the light path for a camera with an internal image bearing means and an external translucent filter in accordance with the present invention.

FIG. 5A is a light ray diagram showing the use of an external translucent filter (more generally an external light partitioning means) having a central opening. The distance between the lens and the translucent filter has to be carefully adjusted to produce the optimum reflection of light from the translucent filter onto the pattern on the slide (reflections of ambient light between the camera body and the translucent filter is desirable to assist in illuminating the pattern). A distance of about 10mm is preferred. Since the translucent filter is very close to the lens, the image of the (surface of the) filter itself will not be focused onto the film.

FIG. 5B shows the assembly parts of a camera implementing FIG. 5a. The holder should preferably be translucent too to allow more light in for reflection from the translucent filter onto the pattern.

Figure 6A:
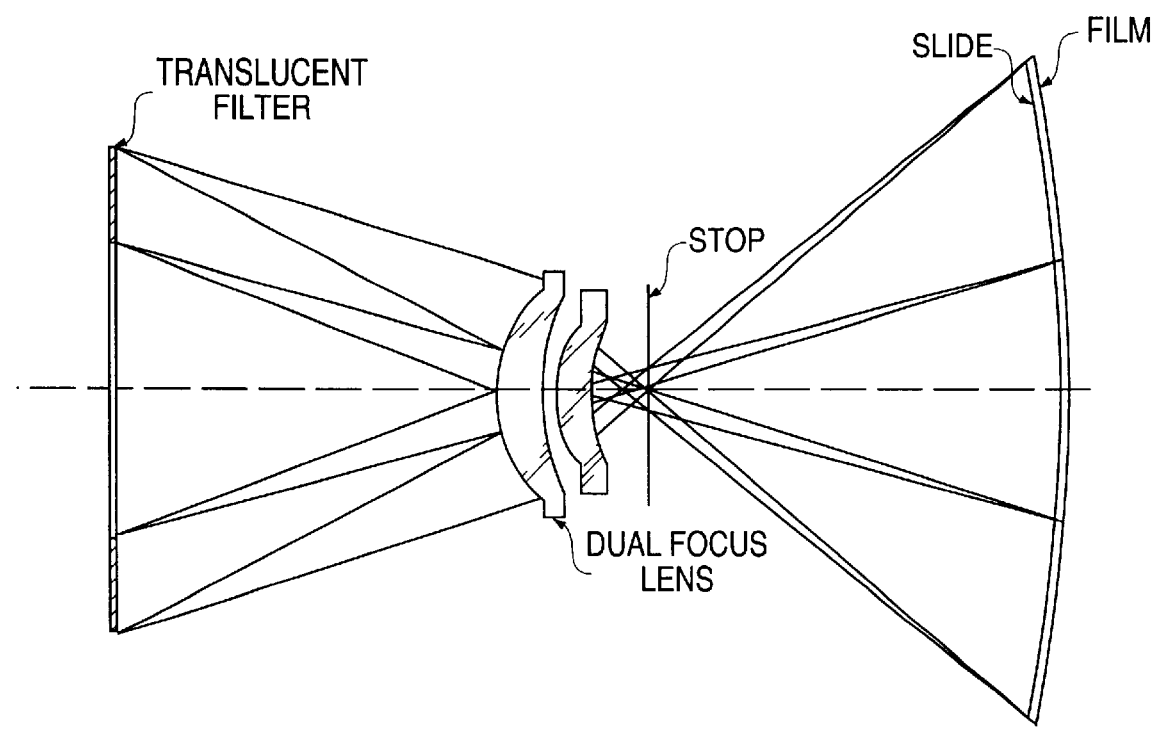
FIG. 6A is a ray diagram showing a light path for a camera with an internal image bearing means, an external translucent filter and a dual focus means in accordance with the present invention.

FIG. 6A is a light rays diagram showing the addition of a light focusing means (a dual focus lens in the drawing) for focusing light from the translucent filter onto the pattern thereby enhancing the intensity of light falling onto the pattern. The central portion of the additional lens should have an infinite focal length allowing light constituting the object to be shot to go straight through while the focal length of the outer portion of the additional lens should be so as to be able to focus essentially white light but not the surface image of the translucent filter onto the pattern. A focal length of about 30mm is preferred for the outer portion of the additional lens.

Figure 6B:
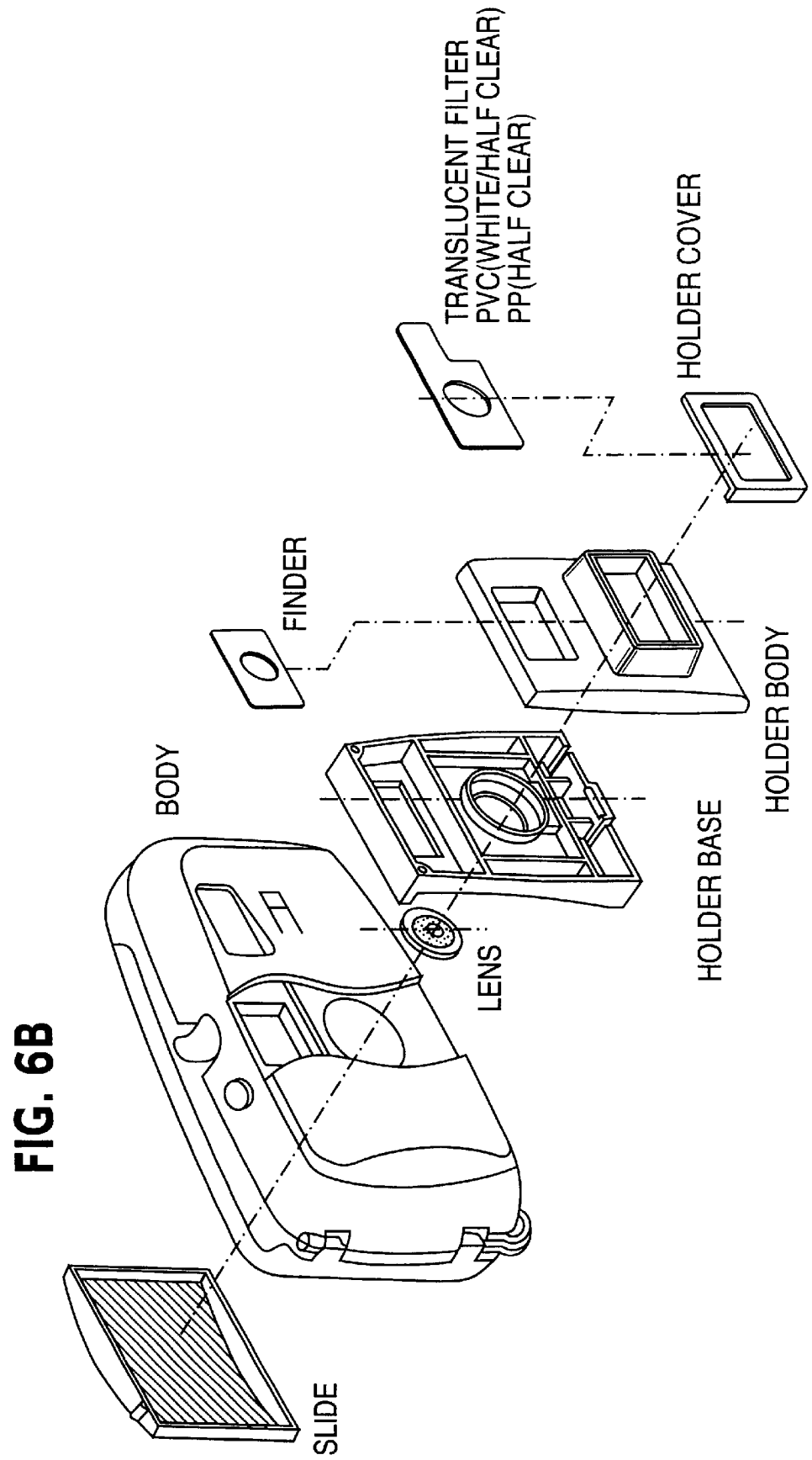
FIG. 6B exploded view of a camera corresponding to the ray diagram of FIG. 6A.

FIG. 6B shows the assembly parts of a camera implementing FIG. 6A.

(2) Internal Light Partitioning Means

FIG. 7A is a light rays diagram showing the use of an internal translucent filter (more generally an internal light partitioning means) having a central opening. Light coming out from the outer portion of the translucent filter should be essentially white light.

FIG. 7B shows the assembly parts of a camera implementing FIG. 7A.

FIG. 7C shows a longitudinal wave-shaped or textured filter that will cause light rays passing through it to be out-focused so that essentially only white light will fall onto the pattern on the slide. Because this filter does not rely on surface finishing to cause light rays to be out-focused, relatively more light (as compared with the case of surface finishing) is allowed through the filter to illuminate the pattern. Some finishing, however, may be applied to the filter to double the effect of out-focusing.

FIG. $7D_1$ illustrates the use of a circular wave-shaped or textured filter to cause light rays to be out-focused. The same discussion as for FIG. 7C above applies. In addition, this kind of out-focusing means has an advantage similar to that used in a flash light diffuser, i.e., light is focused onto the pattern to illuminate it (although the focusing is insufficient to form visible objects).

FIGS. $7D_2$, $7D_3$ and $7D_4$ illustrate a grooved formation on a filter. Two groove or wave formations are required in order to focus onto a rectangular image-recording medium.

FIG. 7E shows a box storing a fluid (which can be gaseous or liquid), except for the central conical portion, which fluid will cause light rays passing through it to be out-focused onto the pattern on the slide. In addition, variation in concentration of the fluid provides a light adjusting means.

FIG. 7F illustrates the implementation of a light focusing means for focusing stray light onto the pattern. The drawing shows four lenses (which is the minimum) on the filter only; however, there can be more lenses. The "lenses" can be produced by shaping the filter appropriately at appropriate places. They not only focus stray light but also out-focus the light rays in order to produce essentially white light. The filter could also be "translucent" to double the effect of out-focusing in producing essentially white light.

FIG. 7G illustrates the use of a transparent filter containing a large number of "lenses" for focusing as well as out-focusing (as explained above). This filter, being transparent, has the advantage of allowing the maximum amount of light through the filter falling onto the pattern.

FIG. 7H shows the use of a special device for out-focusing. The device is substantially transparent with the refractive indexes arranged in such a way that light rays passing through it do not focus on the pattern. Because the device is substantially transparent, the amount of light passing through is maximized. One advantage of this particular implementation is that the interference between the light for illuminating the pattern and the light constituting the object to be shot is minimised.

FIGS. 8A and 8B show the use of an internal dual focus lens as a light focusing means for focusing more light in through the "translucent" filter to illuminate the pattern. Double out-focusing can be achieved by combining the out-focusing effect of the additional dual focus lens (the outer portion of which does not focus onto the pattern) with that of the translucent filter.

FIGS. 9A and 9B show the use of an external dual focus lens for focusing more light in through the "translucent" filter to illuminate the pattern. Again, double out-focusing can be achieved by combing the out-focusing effect of the additional lens with that of the translucent filter.

FIGS. 10A and 10B show the use of the combined effect of surface finishing (e.g., grinding) and dual focusing on one single external lens. Light adjusting means can be provided by way of the degree of surface finishing.

FIGS. 11A to 11D illustrate various methods to enhance the illumination of the pattern on the slide. FIG. 11A shows a clear holder for supporting the translucent filter, with the holder allowing stray light to fall onto the filter. FIG. 11B illustrates the use of light conducting poles to control the light falling onto the pattern. FIG. 11C shows a special type of device that minimizes the loss of light energy (because the minimum material for light out-focusing and light adjusting is used). FIG. 11D shows a special type of device containing internal reflective elements (e.g., mirrors) as light adjusting means and light focusing means.

FIG. 12 shows an embodiment of a light adjusting means in which the thickness of a translucent filter is varied across the filter. The translucent filter has two areas of different opaqueness. The first area is of greater opaqueness and has a varying thickness. The amount of light passing though the translucent filter varies in relation to the time of exposure across the filter. The greatest thickness of the translucent filter (3) is at the bottom left corner of FIG. 12. The top left and bottom right corners have a reduced thickness (2) and a mid-point on the right side has a further reduced thickness (1.5). The shape of the first area of the translucent filter has been determined by experiment to correspond the amount of light transmitted through the filter with the time of exposure of that part of the filter as the shutter crosses the aperture.

FIGS. 13A–13C show a shutter and its positions as it opens and closes across the aperture in relation to the light adjusting means and in particular the thickness of the translucent filter. The thickness can be approximated to a linear relationship as shown in the figures.

External Image Bearing Means

The camera 1 with a holder 8 as shown in FIGS. 3a and 3b can be used without a filter 14 inside the camera 1. In this arrangement, an image is provided on the inside surface of the plate 10.

FIG. 14 shows an arrangement for a camera, in accordance with one of the aspects of the present invention, in which a special lens is placed in front of the object lens of an ordinary camera, so that it is positioned in between the object to be taken and the object lens. The focal length is not uniform across the special lens, but is infinite in the central area of the lens and is relatively short in the "non-central" area (the lens being in effect an aspheric lens). Alternately, a hole can be provided at the center of the special lens allowing light to pass through the object lens directly at the center part of the special lens.

When light passes through the central area, it is not deflected at all before it reaches the object lens of the camera, so that the focal length of the camera with respect to the object to be taken is not altered by the presence of the special lens.

On the other hand, when light passes through the "non-central" area of the special lens, it is focused onto the object lens such that the combined focusing effects of the "non-central" area of the special lens and of the object lens enable close objects to be focused onto the camera film. These close objects are in this embodiment the pattern that is desired to be superimposed onto the film. A focus at a close distance of about 10mm can be achieved. In an ordinary camera an object generally needs to be spaced at least 1m from the object lens.

In this particular embodiment, a holder is provided which can be removably fixed to the front of the camera. The holder has a slot into which a replaceable thin plastic plate can be inserted. The plastic plate has two holes in it, corresponding to the object lens and the viewfinder respectively. The object taken is captured through the lower hole. The hole can be of any desirable shape. The holder as described above in the first and second embodiments can be used.

The special lens is placed in a position between the plate and the object lens and can, for example, be removably installed or permanently fixed along the inner surface of the back wall of the holder. The "central" area of the special lens corresponds to the lower hole of the plate. The pattern to be superimposed is pre-printed on the back of the plate, or can be drawn or written (with words) by customers. The holder containing the special lens and the plate can be an attachment or accessory for adaptation of a standard camera.

A small flashbulb is installed on the camera such that when a picture of the object is taken, a flash of the flashbulb causes light to enter the holder and reflect the pattern onto the "non-central" area of the special lens and then the object lens.

Figure 1:
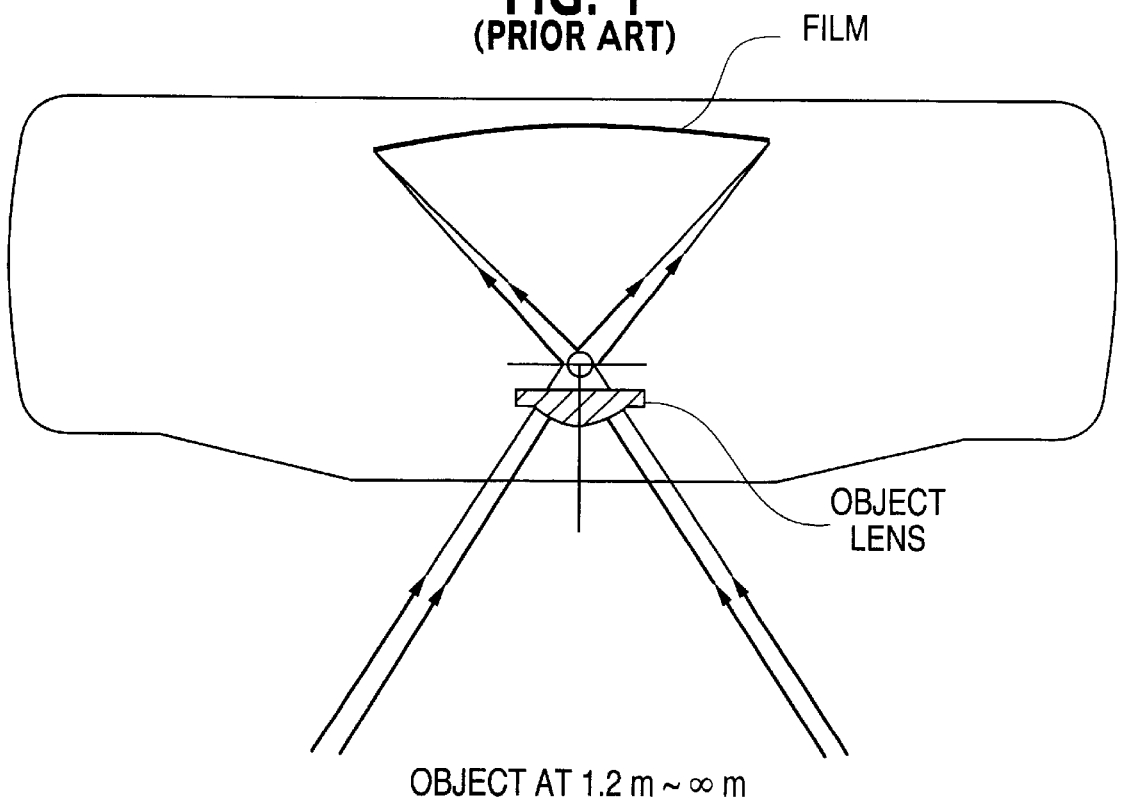
FIG. 1 is a ray diagram showing the light path for a camera according to the prior art.
Figure 2:
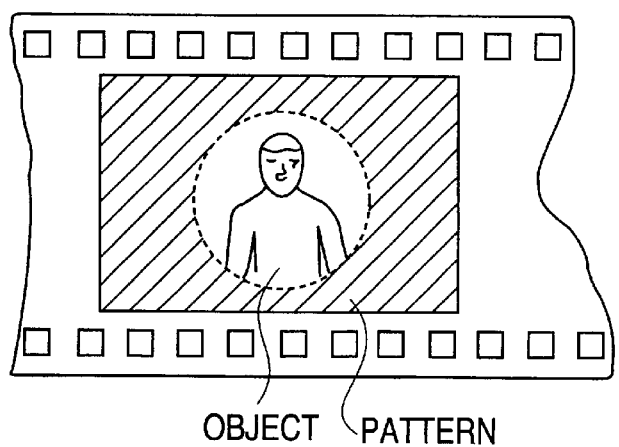
FIG. 2 is a diagrammatic representation of a photographed image using a camera and method in accordance with the present invention.

A picture as shown in FIG. 2 is thus taken, with the pattern surrounding the object being the pattern printed on the back of the plate.

To achieve good quality results, the holder is made of white-colored plastic material (as is the plate) to ensure that the pattern is superimposed on a white background. It should also allow flashlight to pass through. To achieve uniform brightness across the plate, a black filter is installed on the side wall of the holder that is closer to the flashbulb to reduce the brightness on that side.

The holder also serves the purpose of producing an even distribution of light into the special lens.

It is envisaged that the diffusion of light inside the holder can be further improved by having diamond shaped corrugated features allowing multiple refractions of light.

In another embodiment, the special lens is incorporated with the object lens so that only one lens is necessary. A two-lens system, however, has the advantage that the camera can easily operate as an ordinary camera to take "normal" pictures without added effects by removing the special lens and/or the holder.

To address the problem of lighting the pattern, one method, as described above is to provide a white holder allowing the flashlight to enter and get reflected in the holder.

Three additional methods of addressing the problem of lighting are as illustrated by the FIGS. 15 to 17.

(1) FIGS. 15A and 15B show a reflector (e.g., a mirror) of suitable shape for reflecting light onto the pattern and which is disposed between the slide and the lens.

(2) FIG. 16 shows a reflector of suitable shape disposed in such a way that the slide is between the reflector and the lens.

(3) FIGS. 17A and 17B illustrate the use of a light conducting medium (e.g., optical fiber) for guiding light to the pattern.

Modifications and improvements can be made to the forgoing without department from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A camera with a lens and guiding means for an image recording medium, the camera comprising:

support means disposed in front of the lens of the camera;

a plate supported in the support means, the plate having a window through which the lens can receive light from an object being photographed; and a filter providing an image or pattern disposed in front of the guiding means for an image recording medium,
      wherein a composite picture can be formed in a single exposure of light composed of an image from light through the window in the plate and the image or pattern of the filter by light reflected or diffused through the plate.

2. A camera as claimed in claim 1, wherein the window is an aperture.

3. A camera as claimed in claim 1, wherein the plate is of white or light colored material at least on a surface opposite the lens.

4. A camera as claimed in claim 1, wherein the plate is a white plastics material.

5. A camera as claimed in claim 1, wherein the plate has a second aperture corresponding to a viewfinder of the camera.

6. A camera as claimed in claim 1, wherein the support means is in the form of a holder with side walls.

7. A camera as claimed in claim 6, wherein the plate is supported in the holder by the side walls.

8. A camera as claimed in claim 6, wherein the holder is formed of a white plastics material.

9. A camera as claimed in claim 1, wherein the holder has a back wall with an aperture corresponding to the position of the lens.

10. A camera as claimed in claim 9, wherein a second aperture is provided in the back wall of the holder for a viewfinder of the camera.

11. A camera as claimed in claim 10, wherein the holder has an additional wall between the two apertures.

12. A camera as claimed in claim 6, wherein the holder has an aperture in one of the side walls adjacent a flashlight of the camera to allow the ingress of light.

13. A camera as claimed in claim 6, wherein the side wall of the holder adjacent the flashlight has a black colored inside surface.

14. A camera as claimed in claim 6, wherein the holder snap fits onto the camera.

15. A camera as claimed in claim 1, wherein the guiding means for an image-recording medium is adapted to guide a frame of a film behind the lens.

\* \* \* \* \*